US 10,206,525 B2

(12) United States Patent
Huffar et al.

(10) Patent No.: US 10,206,525 B2
(45) Date of Patent: Feb. 19, 2019

(54) ICE MERCHANDISER WITH ON-PRODUCT FINANCIAL PAYMENT SYSTEM

(71) Applicant: Leer, Inc., New Lisbon, WI (US)

(72) Inventors: William M. Huffar, Cazenovia, WI (US); Stephen J. Dieter, Oregon, WI (US); Terry D. Matt, Evansville, WI (US); John A. Miller, Sun Prairie, WI (US); Nicholas A. Truesdale, Madison, WI (US)

(73) Assignee: Leer, Inc., New Lisbon, WI (US)

( * ) Notice: Subject to any disclaimer, the term of this patent is extended or adjusted under 35 U.S.C. 154(b) by 502 days.

(21) Appl. No.: 14/921,413

(22) Filed: Oct. 23, 2015

(65) Prior Publication Data

US 2016/0113422 A1    Apr. 28, 2016

Related U.S. Application Data

(60) Provisional application No. 62/068,336, filed on Oct. 24, 2014.

(51) Int. Cl.
*A47F 10/02* (2006.01)
*F25D 11/04* (2006.01)
(Continued)

(52) U.S. Cl.
CPC .............. *A47F 10/02* (2013.01); *F25D 11/04* (2013.01); *F25D 17/042* (2013.01); *G06Q 20/18* (2013.01);
(Continued)

(58) Field of Classification Search
CPC .......... G06Q 10/00; G06Q 10/08; G07F 5/00; G07F 5/18; G07F 9/026; G01G 19/414
(Continued)

(56) References Cited

U.S. PATENT DOCUMENTS 4,891,755 A * 1/1990 Asher ................... G01G 19/414
                                                          177/210 R
5,109,651 A   5/1992 Stuart
(Continued)

FOREIGN PATENT DOCUMENTS

WO   WO-2007/118140   10/2007
WO   WO-2011/097153    8/2011
WO   WO-2012/034850    3/2012

OTHER PUBLICATIONS

BioZone Scientific International, BioZone IceZone Series product information, available at least as early as Mar. 6, 2014; retrieved from the internet at http://www.biozonescientific.com/applications/ice-machine-sanitation-and-preventative-maintenance on Oct. 22, 2015, 4 pages.

(Continued)

*Primary Examiner* — Olusegun Goyea
(74) *Attorney, Agent, or Firm* — Foley & Lardner LLP

(57) ABSTRACT

An ice merchandiser for storing bagged ice for purchase by a customer is provided. The ice merchandiser includes a payment system for facilitating a bagged ice product transaction at the ice merchandiser. The payment system includes a mass determination module structured to determine a mass of bagged ice product removed during the bagged ice product transaction and a transaction module structured to determine an amount of currency required for the bagged ice product transaction based on the determined mass of bagged ice product removed.

18 Claims, 22 Drawing Sheets

(51) Int. Cl.
*G06Q 20/18* (2012.01)
*G06Q 20/20* (2012.01)
*G07F 9/00* (2006.01)
*G07F 9/10* (2006.01)
*G07F 11/62* (2006.01)
*F25D 17/04* (2006.01)

(52) U.S. Cl.
CPC .......... *G06Q 20/208* (2013.01); *G07F 9/006* (2013.01); *G07F 9/105* (2013.01); *G07F 11/62* (2013.01); *F25D 2317/0417* (2013.01); *F25D 2331/801* (2013.01)

(58) Field of Classification Search
USPC .......................... 705/28; 235/375, 376, 382
See application file for complete search history.

(56) References Cited

U.S. PATENT DOCUMENTS

| | | | |
|---|---|---|---|
| 5,267,672 A | 12/1993 | Jacobsen et al. | |
| 5,299,906 A | 4/1994 | Stone | |
| 5,458,851 A | 10/1995 | Schroeder et al. | |
| D372,036 S | 7/1996 | Timura et al. | |
| 5,567,926 A * | 10/1996 | Asher | G07F 5/18 235/375 |
| 5,581,982 A | 12/1996 | Schroeder et al. | |
| 5,630,310 A | 5/1997 | Chadwell | |
| 5,699,676 A | 12/1997 | Trulaske, Sr. | |
| 5,708,223 A | 1/1998 | Wyss | |
| 5,728,999 A | 3/1998 | Teicher | |
| 5,752,393 A | 5/1998 | Schlosser et al. | |
| 5,822,955 A | 10/1998 | Woosley et al. | |
| 5,833,198 A | 11/1998 | Graetz | |
| 5,986,219 A * | 11/1999 | Carroll | G06Q 10/087 177/1 |
| 6,068,305 A | 5/2000 | Myers et al. | |
| 6,337,129 B1 | 1/2002 | Watanabe et al. | |
| 6,349,244 B1 * | 2/2002 | Bardin | G06Q 10/087 221/108 |
| 6,435,630 B1 | 8/2002 | Anin et al. | |
| 6,506,428 B1 | 1/2003 | Berge et al. | |
| 6,596,233 B2 | 7/2003 | Berge et al. | |
| 6,606,869 B2 | 8/2003 | Takahashi et al. | |
| 6,619,051 B1 | 9/2003 | Kilawee et al. | |
| 6,658,884 B2 | 12/2003 | Takahashi et al. | |
| 6,904,946 B2 | 6/2005 | James | |
| 6,932,124 B2 | 8/2005 | Dalton et al. | |
| 7,032,401 B2 | 4/2006 | Dresser | |
| 7,032,406 B2 | 4/2006 | Hollen et al. | |
| 7,104,291 B2 | 9/2006 | Dalton et al. | |
| 7,246,784 B1 | 7/2007 | Lopez | |
| 7,344,210 B2 | 3/2008 | Dresser | |
| 7,426,945 B2 | 9/2008 | Dalton et al. | |
| 7,681,411 B2 | 3/2010 | Dilorenzo | |
| 7,735,527 B2 | 6/2010 | Dunn | |
| 7,757,513 B2 | 7/2010 | Paine | |
| 7,806,152 B2 | 10/2010 | Dalton et al. | |
| 8,161,769 B2 | 4/2012 | Lauchnor | |
| 8,162,210 B2 | 4/2012 | Mcinerney et al. | |
| 8,245,488 B2 | 8/2012 | Dunn | |
| 8,328,438 B2 | 12/2012 | Johnson et al. | |
| 8,353,146 B1 | 1/2013 | Bareford et al. | |
| 8,381,534 B2 | 2/2013 | Metzger | |
| 8,387,405 B2 | 3/2013 | Johnson | |
| 8,468,784 B2 | 6/2013 | Metzger | |
| 8,484,935 B2 | 7/2013 | Leblanc et al. | |
| 8,511,101 B1 | 8/2013 | Seymour | |
| 8,528,302 B2 | 9/2013 | Shaker et al. | |
| 8,534,034 B1 | 9/2013 | Pape | |
| 8,545,113 B2 | 10/2013 | Johnson et al. | |
| 8,561,655 B2 | 10/2013 | Dalton et al. | |
| 8,739,557 B2 | 6/2014 | Metzger | |
| 8,800,305 B2 | 8/2014 | Pape et al. | |
| 8,813,516 B2 | 8/2014 | Min et al. | |
| 2003/0046947 A1 | 3/2003 | Ohya et al. | |
| 2003/0150230 A1 * | 8/2003 | Waddle | A47F 3/0404 62/246 |
| 2004/0214010 A1 | 10/2004 | Murata et al. | |
| 2005/0095121 A1 | 5/2005 | Vithani | |
| 2006/0002685 A1 | 1/2006 | Jeong | |
| 2006/0138910 A1 | 6/2006 | Dresser | |
| 2006/0150645 A1 | 7/2006 | Leaver | |
| 2007/0162182 A1 | 7/2007 | Marti et al. | |
| 2007/0193318 A1 | 8/2007 | Churchill et al. | |
| 2007/0196244 A1 | 8/2007 | Croft | |
| 2007/0267093 A1 | 11/2007 | Soderman | |
| 2008/0006313 A1 | 1/2008 | Wang | |
| 2008/0104972 A1 | 5/2008 | Finkenauer | |
| 2008/0272565 A1 | 11/2008 | Fitzgerald et al. | |
| 2008/0295462 A1 | 12/2008 | Metzger | |
| 2009/0142225 A1 | 6/2009 | Tornqvist | |
| 2009/0183523 A1 | 7/2009 | Willette | |
| 2009/0244884 A1 | 10/2009 | Trulaske, Sr. | |
| 2010/0197748 A1 | 8/2010 | Schwarz et al. | |
| 2010/0223944 A1 | 9/2010 | Tsujimoto et al. | |
| 2011/0160334 A1 | 6/2011 | Lisec | |
| 2011/0185749 A1 | 8/2011 | Metzger | |
| 2011/0238209 A1 | 9/2011 | Roekens et al. | |
| 2011/0238210 A1 | 9/2011 | Roekens | |
| 2012/0031054 A1 * | 2/2012 | Broadbent | B65B 5/067 53/467 |
| 2012/0070264 A1 | 3/2012 | Pape | |
| 2012/0186202 A1 | 7/2012 | Pandurangan et al. | |
| 2012/0198870 A1 | 8/2012 | Erbs et al. | |
| 2012/0291458 A1 | 11/2012 | Seibert et al. | |
| 2013/0000327 A1 | 1/2013 | Olson, Jr. et al. | |
| 2013/0087577 A1 | 4/2013 | Berge et al. | |
| 2013/0104579 A1 | 5/2013 | Zhou | |
| 2013/0133296 A1 | 5/2013 | Metzger | |
| 2013/0180267 A1 | 7/2013 | Hartig et al. | |
| 2013/0219925 A1 | 8/2013 | Camatta et al. | |
| 2013/0273132 A1 | 10/2013 | Eddy | |
| 2014/0199151 A1 | 7/2014 | Pape | |
| 2014/0316561 A1 | 10/2014 | Tkachenko et al. | |

OTHER PUBLICATIONS

Ice House America, Smart Ice Product Information page, 2014, retrieved from the internet at http://www.icehouseamerica.com/smartice on Sep. 4, 2014, 2 pages.

Ice House America, Vending Models information page, 2014, retrieved from the internet at http://www.icehouseamerica.com/vending/vending-models on Sep. 4, 2014, 3 pages.

* cited by examiner

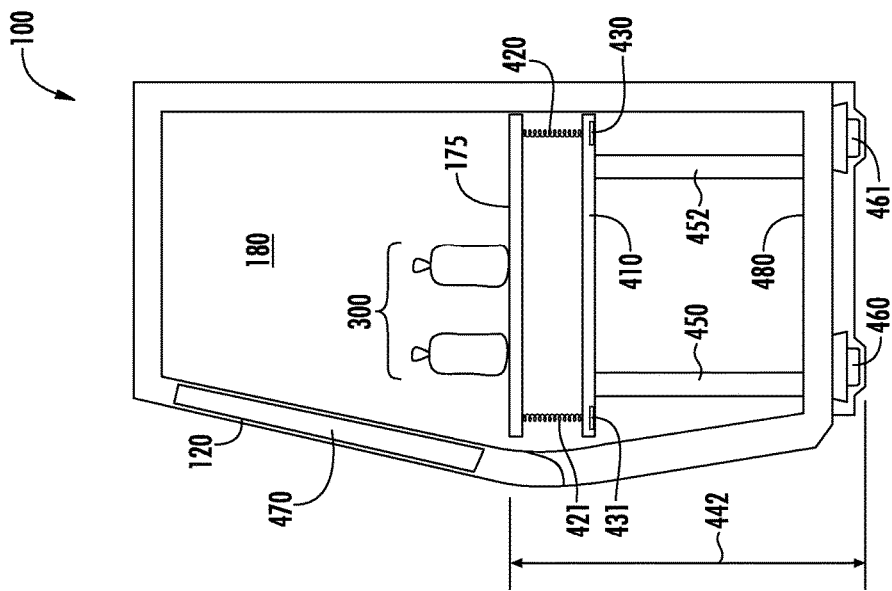
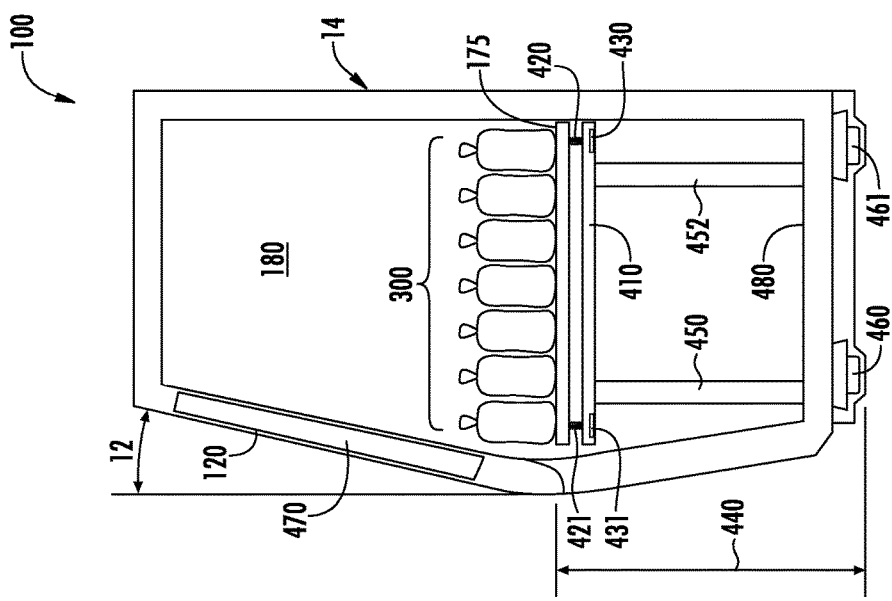
FIG. 4A
FIG. 4B

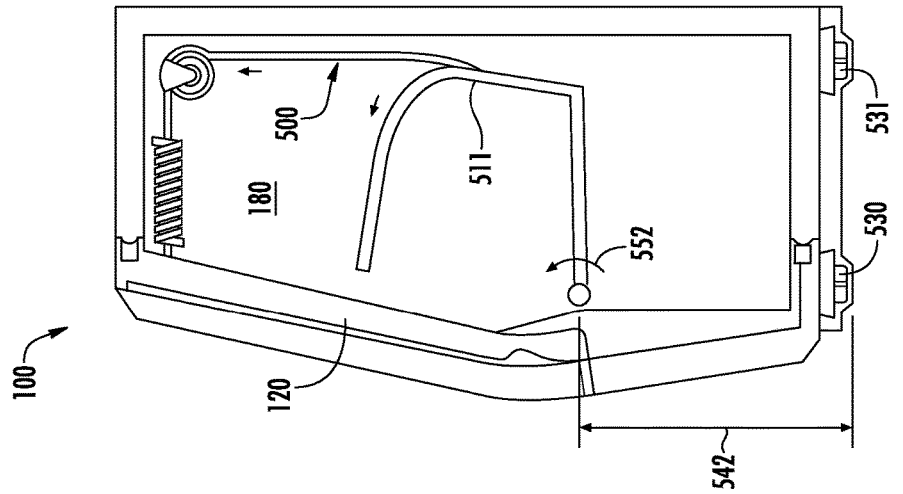
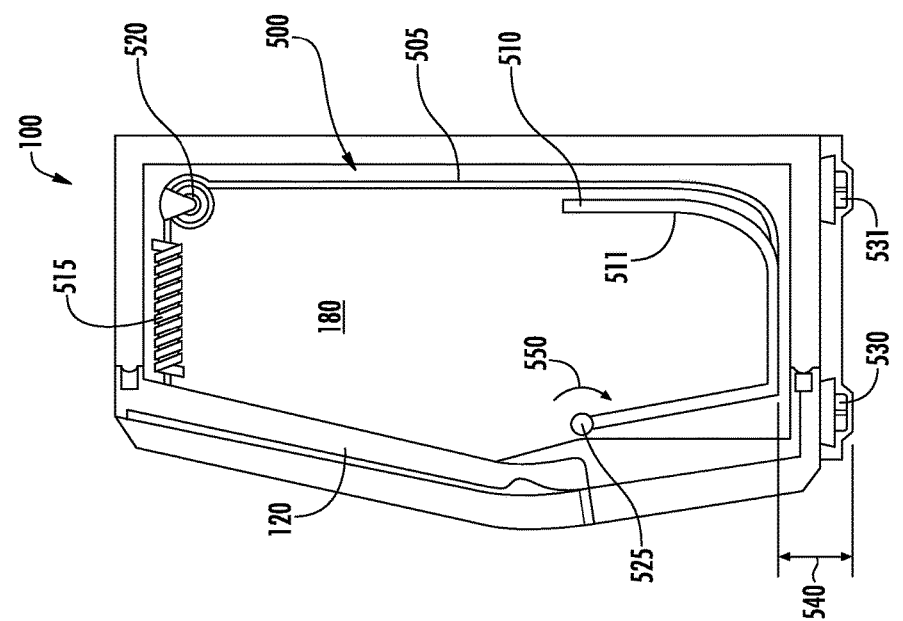
FIG. 5A
FIG. 5B

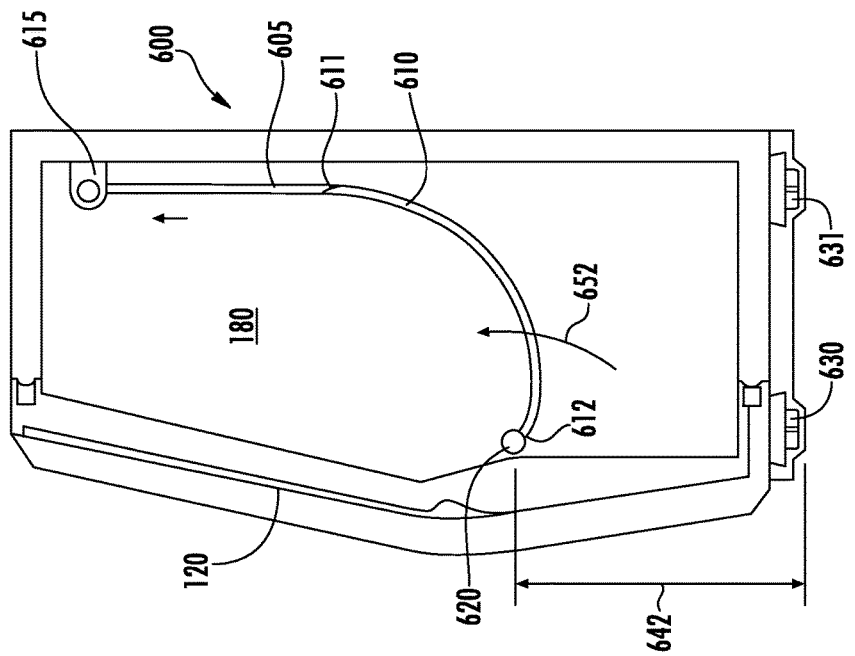
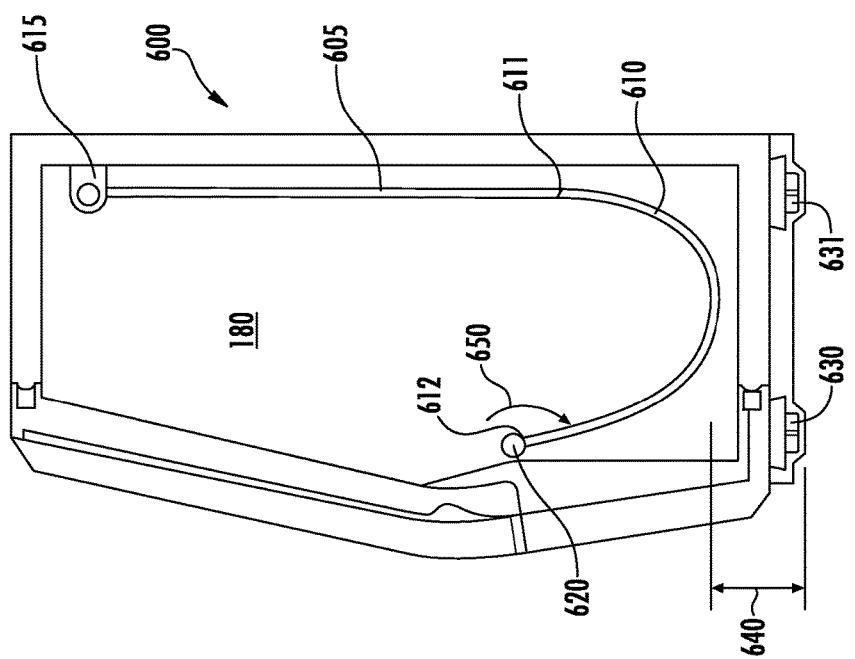

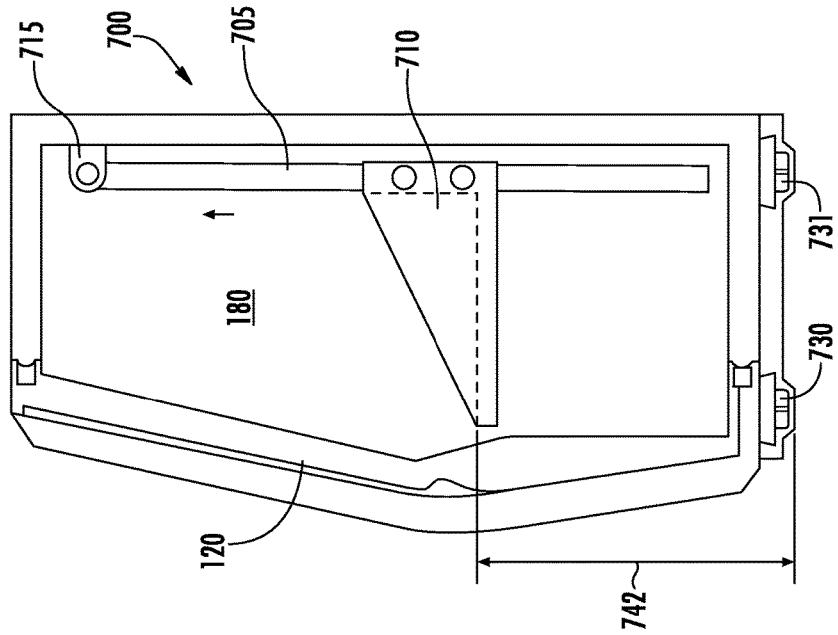
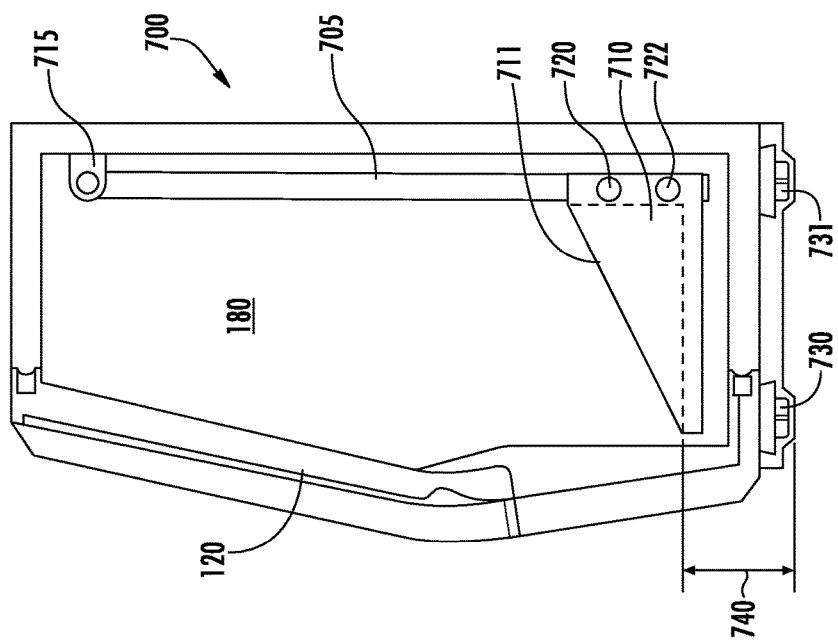

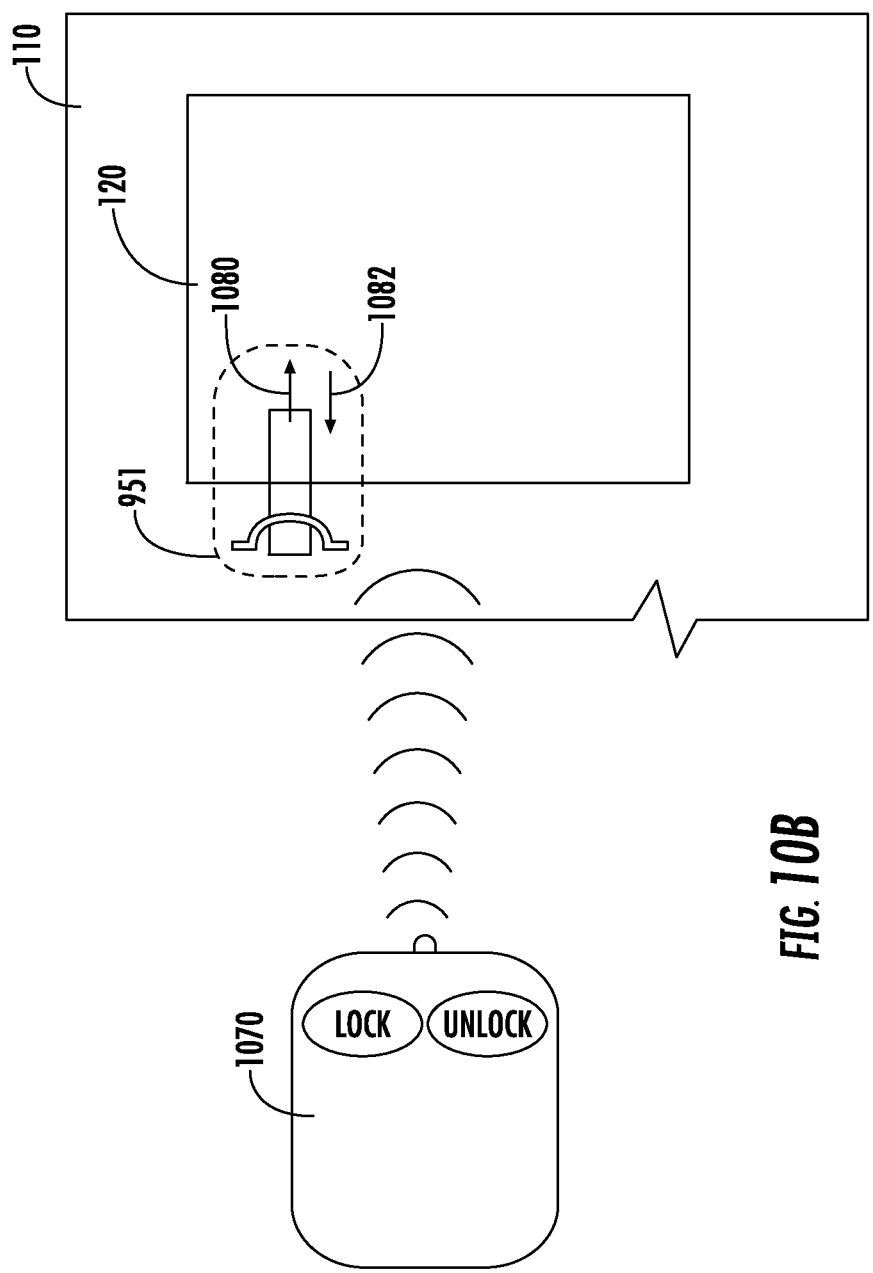

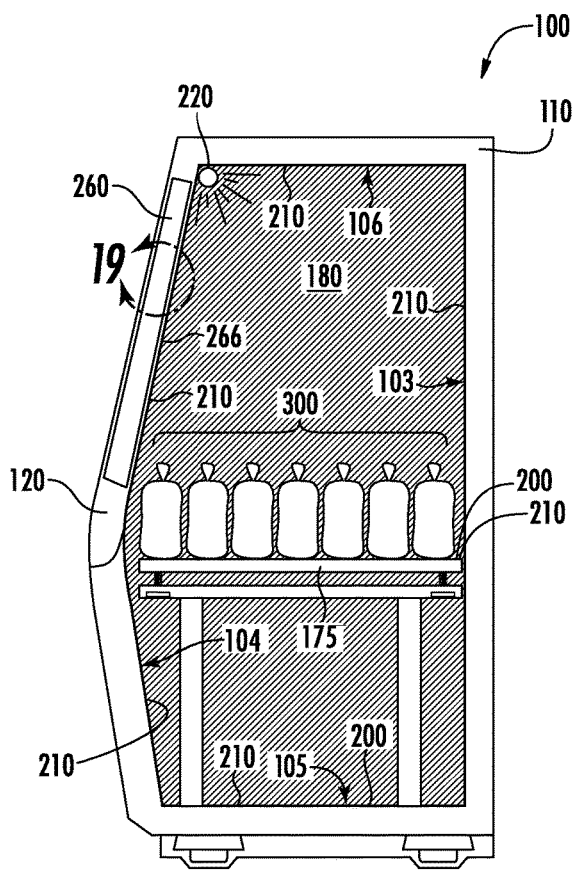
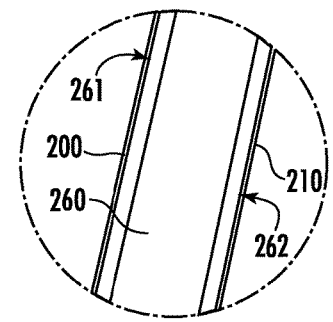
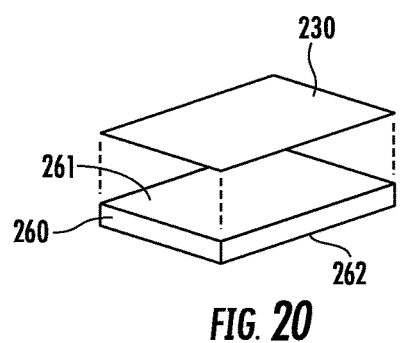
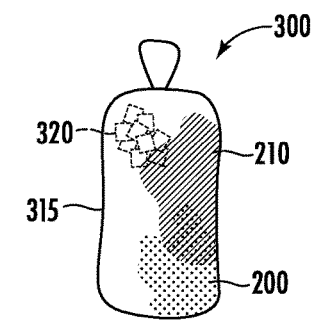
FIG. 18
FIG. 19
FIG. 20
FIG. 21
200 — ANTI-MICROBIAL COATING
210 — HYDROPHOBIC COATING

ICE MERCHANDISER WITH ON-PRODUCT FINANCIAL PAYMENT SYSTEM

CROSS-REFERENCE TO RELATED APPLICATIONS

This application claims the benefit of U.S. Provisional Patent Application No. 62/068,336 entitled "ICE MERCHANDISER," filed Oct. 24, 2014, which is incorporated herein by reference in its entirety.

TECHNICAL FIELD

The present disclosure relates to ice merchandisers for storing and providing an ice product to customers.

BACKGROUND

Ice merchandisers store and supply ice products (e.g., bagged ice) to patrons. Typically, ice merchandisers are located in or around convenient stores (e.g., a grocery store, a fueling station, etc.). Many patrons of these convenient stores complement their purchases with one or more bags of ice stored in the ice merchandiser.

Ice merchandisers are usually fairly large and heavy temperature-controlled storage units. Their size and shape is often dependent upon the ice product that they are designed to store (e.g., one-hundred seven pound bags of ice, three-hundred seven pound bags of ice, etc.), the presence of a refrigeration system, the use of heavy-duty weather-resistant (e.g., rust resistant) materials, and the like. In operation, a patron opens a door of the ice merchandiser, reaches their arms within an interior volume of the ice merchandiser, and removes the ice product from the ice merchandiser. In some configurations, the interior volume may include a platform or shelving system structured to support the ice products. After obtaining the ice product, the door is shut to maintain the temperature of the interior volume to prevent the ice product from melting.

SUMMARY

One embodiment relates to an ice merchandiser for storing bagged ice for purchase by a customer. The ice merchandiser includes a payment system for facilitating a bagged ice product transaction at the ice merchandiser. The payment system includes a mass determination module structured to determine a mass of bagged ice product removed during the bagged ice product transaction, and a transaction module structured to determine an amount of currency required for the bagged ice product transaction based on the determined mass of bagged ice product removed. By including a payment system with the ice merchandiser, patrons may purchase bagged ice directly at the ice merchandiser thereby alleviating the need to make the purchase in a nearby convenient store. This added convenience may lead to an increase in sales potential for the operator of the ice merchandiser.

Another embodiment relates to an ice merchandiser for storing bagged ice for purchase by a customer. The ice merchandiser includes a housing defining a cavity, a platform located in the cavity for holding a bagged ice product, a load cell structured to measure a mass of the bagged ice product, and a payment system communicably coupled to the load cell. The payment system is structured to determine a mass of bagged ice product removed during a bagged ice product transaction and determine an amount of currency required for the bagged ice product transaction based on the determined mass of bagged ice product removed. By charging a patron on a per-mass-removed basis, the patron is free to change their mind regarding how much ice they would like in the middle of the transaction. This provides flexibility and convenience to the patron.

Still another embodiment relates to a method of operating an ice merchandiser. The method includes receiving an initiation of a bagged ice product transaction; validating the bagged ice product transaction; receiving weight data, the weight data corresponding to a mass of bagged ice product stored by the ice merchandiser; determining that the bagged ice product transaction is complete; determining a mass of bagged ice product removed by a customer during the bagged ice product transaction based on the weight data; and charging the customer for the determined mass of bagged ice product removed.

One embodiment relates to an ice merchandiser for storing bagged ice for purchase by a customer. The ice merchandiser includes a payment system structured to enable a patron to facilitate a bagged ice product transaction at the ice merchandiser, and an access control system structured to selectively provide access to the ice merchandiser during the bagged ice product transaction based on the payment system providing an indication that payment for the ice product has been validated. Accordingly, the access control system selectively controls access to the ice merchandiser, which alleviates the need for constant monitoring of the ice merchandiser.

Another embodiment relates to an ice merchandiser. The ice merchandiser includes a housing defining a cavity for storing a bagged ice product; an opening defined by the housing, wherein the opening provides access to the cavity of the ice merchandiser; and a door movable between a first position and a second position, wherein in the first position the door covers the opening and in the second position, the door is positioned away from the opening such that the cavity is accessible. The ice merchandiser also includes a payment system structured to enable a patron to facilitate a bagged ice product transaction at the ice merchandiser, and an access control system structured to selectively provide access to the cavity. The access control system includes one or more locks configured to selectively lock the door to cover the opening. The access control system also includes a timer mechanism structured to unlock the one or more locks for an unlock position duration following the payment system providing an indication that payment for the bagged ice product has been validated.

Still another embodiment relates to a method of operating an ice merchandiser. The method includes receiving an initiation of a bagged ice product transaction; providing access to the ice merchandiser for an unlock position duration; receiving position data, the position data providing an indication of at least one of a position of a door for the ice merchandiser and a door-to-ice merchandiser contact area; determining that the bagged ice product transaction is complete; and locking the door of the ice merchandiser to prohibit access to the ice merchandiser.

One embodiment relates to an ice merchandiser for storing bagged ice for purchase by a customer. The ice merchandiser includes a housing defining a cavity, and a platform located in the cavity for holding and supplying a bagged ice product. The platform is structured to elevate based on bagged ice product being removed from the platform, wherein the platform is movable between a loaded position height and an ice product removal height. According to one embodiment, the self-elevating platform is configured to maintain an ergonomic ice product removal height to alleviate much of the need for the patron to bend over into the ice merchandiser. As a result, injury caused from the lifting and removing of the bagged ice product, such as back strain, may be reduced.

Another embodiment relates to an ice merchandiser. The ice merchandiser includes a housing defining a cavity and a self-elevating platform assembly located in the cavity for holding and supplying a bagged ice product. The self-elevating platform assembly includes a platform structured to hold the bagged ice product, one or more springs coupled to the platform, and a support frame coupled to the one or more springs. The one or more springs are structured to move the platform between a loaded position height and an ice product removal height based on at least one of bagged ice product being added to and removed from the platform.

Still another embodiment relates to method of operating an ice merchandiser. The method includes receiving a bagged ice product on a platform of the ice merchandiser; descending the platform toward a ground surface based on the received bagged ice product; providing at least a portion of the received bagged ice product; and elevating the platform based on the at least a portion of the bagged ice product being provided.

One embodiment relates to an ice merchandiser for storing bagged ice for purchase by a customer. The ice merchandiser includes a housing defining a cavity and an opening, wherein the opening provides access to the cavity of the ice merchandiser; a door including a window for viewing into the cavity, wherein the door is movable between a first position and a second position, wherein in the first position the door covers the opening and in the second position, the door is positioned away from the opening such that the cavity is accessible; a handle located on the door; and an anti-microbial coating, wherein the anti-microbial coating is provided on the handle and an interior surface of the housing within the cavity. The anti-microbial coating is configured to at least partly kill or inhibit growth of harmful microorganisms to thereby maintain a relatively hygienic ice merchandiser.

Another embodiment relates to an ice merchandiser for storing bagged ice for purchase by a customer. The ice merchandiser includes a housing defining a cavity and an opening, wherein the opening provides access to the cavity of the ice merchandiser; a door that is movable between a first position and a second position, wherein in the first position the door covers the opening and in the second position, the door is positioned away from the opening such that the cavity is accessible; and an ultraviolet lamp located in the cavity of the ice merchandiser. According to one embodiment, the ultraviolet lamp is configured to emit a germicidal beam that is configured to kill or inhibit growth of harmful microorganisms to thereby maintain a relatively hygienic ice merchandiser.

Still another embodiment relates to a method of providing hygienic ice merchandiser. The method includes providing an ice merchandiser that includes a housing defining a cavity and an opening, wherein the opening provides access to the cavity of the ice merchandiser; providing an ultraviolet lamp in the cavity of the ice merchandiser; and providing an anti-microbial coating on a surface of the housing.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

FIGS. 4A-4C depict an ice merchandiser with a self-elevating platform, according to one embodiment.

FIGS. 5A-5B depict an ice merchandiser with a self-elevating platform, according to another embodiment.

FIGS. 6A-6B depict an ice merchandiser with a self-elevating platform, according to still another embodiment.

FIGS. 7A-7B depict an ice merchandiser with a self-elevating platform, according to yet another embodiment.

FIGS. 10A-10B depict a system for providing access to an ice merchandiser, according to one embodiment.

FIG. 18 is a cross-sectional side view of an ice merchandiser with an ultraviolet lamp, according to one embodiment.

FIG. 19 is a close-up view of the window of the door of the ice merchandiser in FIG. 18, according to one embodiment.

FIG. 20 is a perspective view of a window for an ice merchandiser with a thin film, according to one embodiment.

FIG. 21 illustrates bagged ice for the ice merchandiser with anti-microbial and hydrophobic coatings, according to one embodiment.

DETAILED DESCRIPTION

Figure 1:
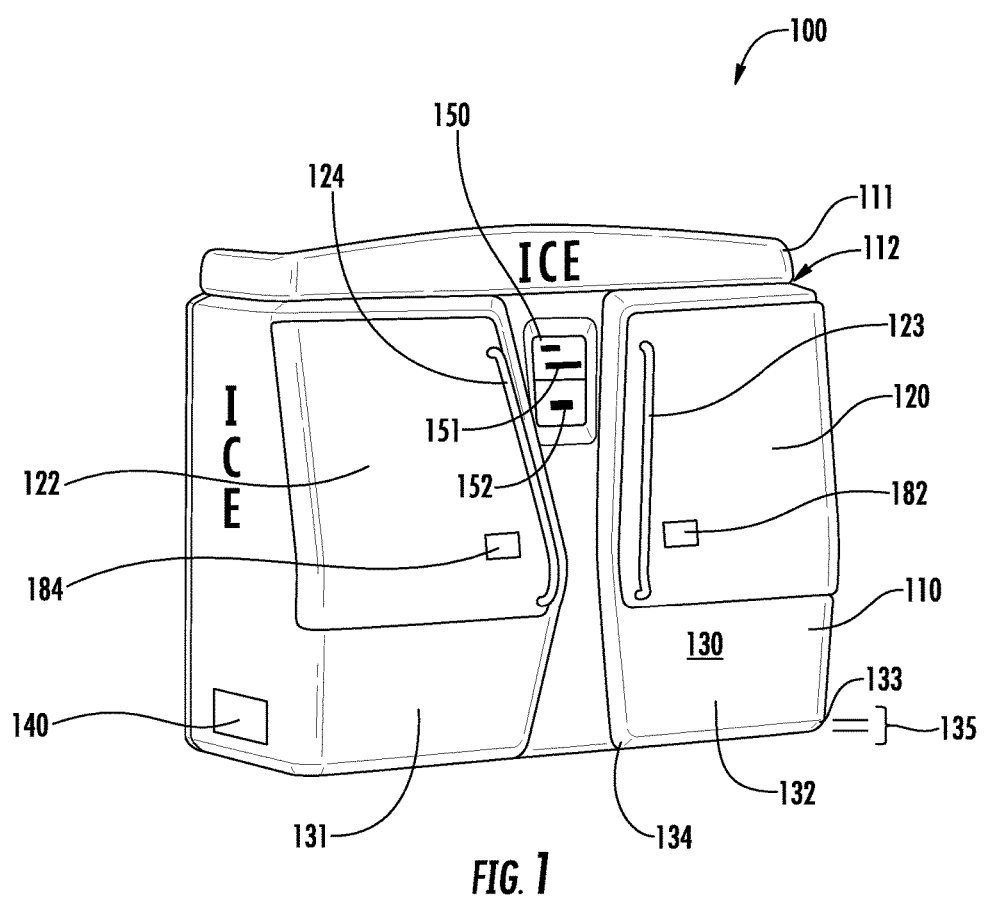
FIG. 1 is a two-door ice merchandiser with both doors in the full close position, according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the Figures generally, an ice merchandiser with various locking/unlocking systems (i.e., access control systems), self-elevating platforms, weight sensing systems, financial payment systems, and "clean and clear" features are shown according to several embodiments herein. Ice merchandisers are structured to store and supply an ice product (e.g., bagged ice) to patrons. Typically, ice merchandisers are located in and/or around convenience stores, grocery stores, and other retail establishments. Many ice merchandisers are located outside of these stores (e.g., against an exterior wall of a fuel stop) to permit convenient access. According to the present disclosure, an ice merchandiser includes a financial payment system that enables patrons to purchase ice product directly at the ice merchandiser, which increases the convenience aspect of the ice merchandiser. The ice merchandiser of the present disclosure also includes a controller communicably coupled to one or more load cells for determining the amount of ice product within the ice merchandiser or removed by a patron. Based on the amount of ice product removed, the controller determines how much to charge the patron. In this regard, the ice merchandiser becomes a self-serve apparatus. Accordingly, the ice merchandiser may provide convenience to patrons and attendants/operators alike who no longer need to monitor the ice merchandiser as frequently. Furthermore, this self-service aspect enables the ice products to be purchase-ready twenty-four hours a day, which may increase the sales potential for the ice merchandiser. While the ice products may be purchase-ready twenty-four hours a day, an access control system may also be included with the ice merchandiser to selectively control access to the ice merchandiser to minimize theft and the need for monitoring of the ice merchandiser. In certain embodiments, the financial payment system and access control system may operate in unison to permit/prohibit access to the ice merchandiser. The ice merchandiser of the present disclosure may also include one or more ergonomic features structured to further aid convenience in interacting with the ice merchandiser. For example, in one embodiment, the ice merchandiser includes a self-elevating platform. The self-elevating platform is structured to receive and hold the ice product. As ice product is removed, the self-elevating platform elevates to an ergonomic height to facilitate removal of the ice product from the ice merchandiser. In this regard, patrons do not need to bend over as far to reach and lift out the ice product, which increases convenience, reduces the likelihood of injury, and may increase sales potential due to the ease of product removal.

Moreover, currently, patrons and distributors make several points of contact with the ice merchandiser to obtain the ice product. This contact increases the potential introduction of microbial contamination into the ice merchandiser. The opening and closing of the ice merchandiser also encourages frost build-up. The frost build-up may incur use of additional space within the ice merchandiser, look unpleasant, and be a source for microbe growth and build-up. Also according to the present disclosure, an ice merchandiser is provided with one or more "clean and clear" features. These "clean and clear" features may include, but are not limited to (as described herein), at least one of an anti-microbial coating, a hydrophobic coating (i.e., an anti-frost coating), and/or an ultraviolet (UV) lamp. The anti-microbial coating may be applied to handles, windows, and any other contact area (even the bagged ice product itself) of the ice merchandiser. In some embodiments, a UV lamp is also placed within the ice merchandiser. The anti-microbial coating(s) and the UV lamp may at least partly inhibit the growth of microbes to maintain a relatively clean (i.e., hygienic) ice merchandiser. The hydrophobic coating may be applied to the interior walls of the ice merchandiser to prevent or eliminate frost build-up within the ice merchandiser. As a result, the ice merchandiser of the present disclosure may reduce frost build-up to maintain a relatively larger space within the ice merchandiser to store bagged ice product and reduce harmful microbe growth by the UV lamp and/or anti-microbial coatings to reduce the transmission of sickness. As a result, an increase in customer satisfaction may occur, which may lead to an increase in sales potential. These and other features of the ice merchandiser of the present disclosure are described more fully herein.

Figure 2:
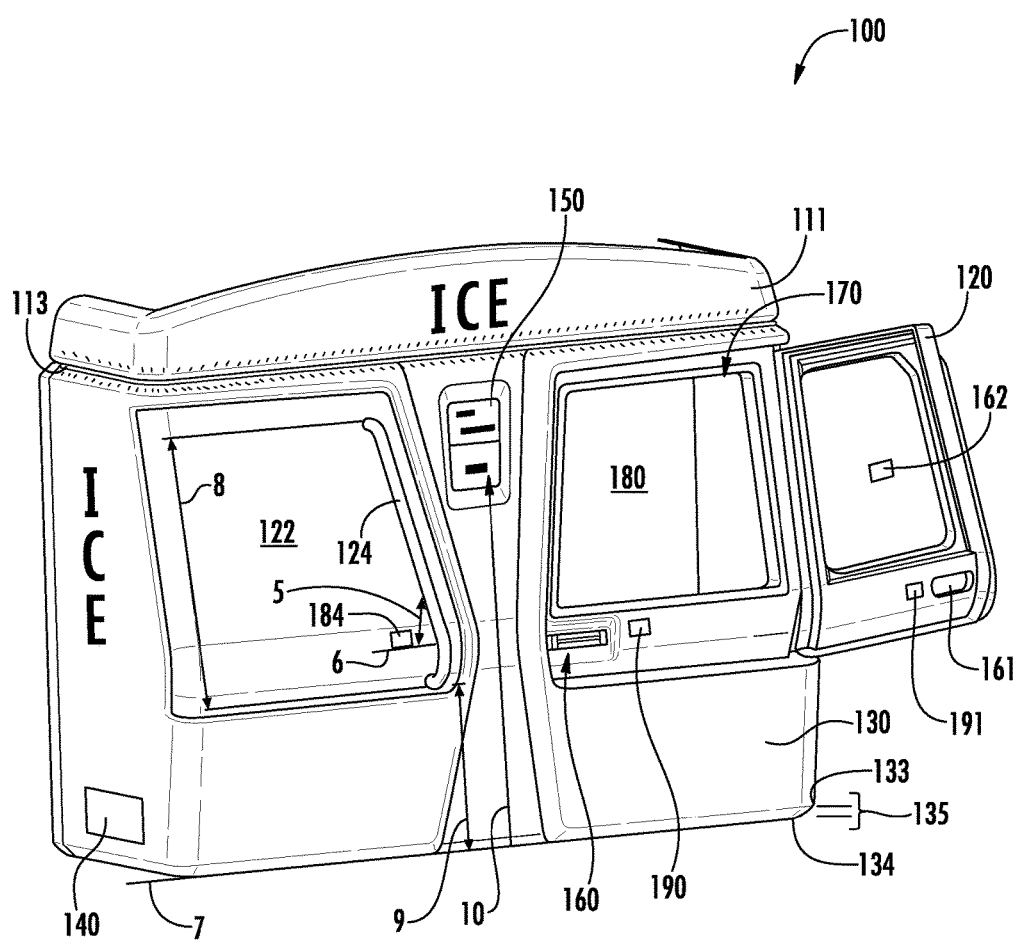
FIG. 2 is a two-door ice merchandiser with one door in the full close position and the other door in the full open position, according to one embodiment.
Figure 3:
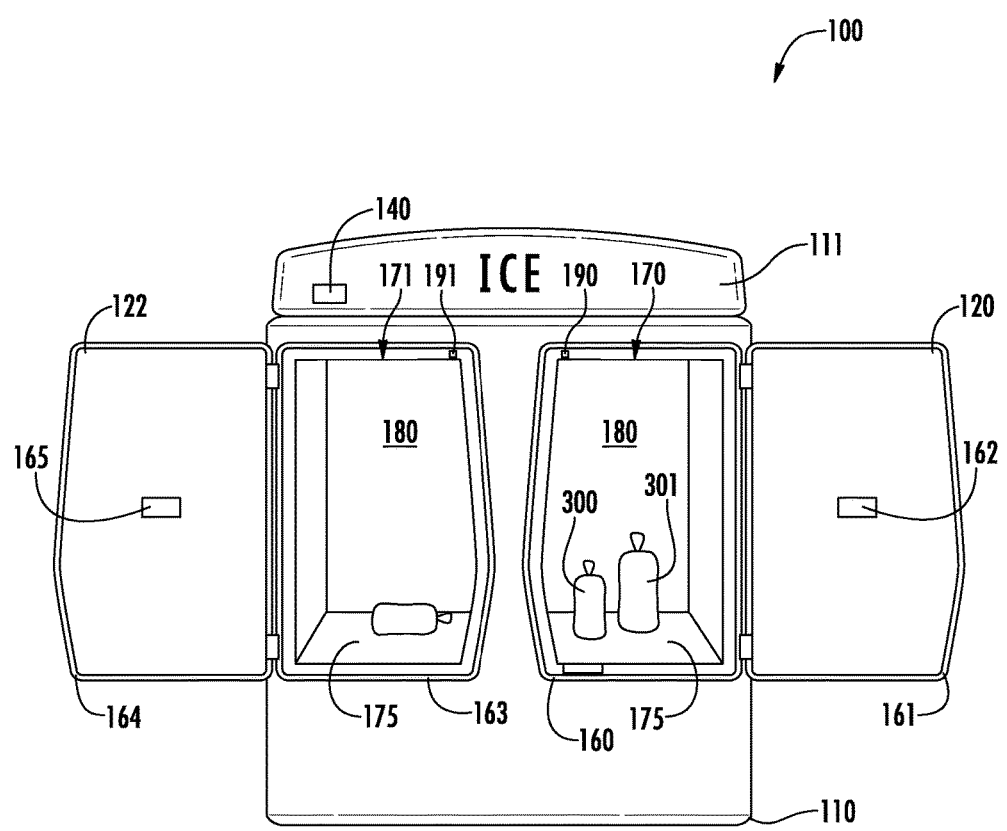
FIG. 3 is a two-door ice merchandiser with both doors in the full open position, according to one embodiment.

Referring now to FIGS. 1-3, an ice merchandiser is shown according to several embodiments. The ice merchandiser 100 is structured as a temperature controlled case for storing, holding, and supplying ice products (e.g., bagged ice) to patrons. As shown, the ice merchandiser 100 is structured as a slant (relative to a ground surface) vertically oriented (i.e., upright) ice merchandiser with front access doors 120, 122 that are at an angle relative to the ground (or floor) 7 that the ice merchandiser 100 rests upon. However, the present disclosure is applicable to any ice merchandiser configuration including, but not limited to: a vertically oriented (i.e., upright) ice merchandiser where the door(s) are substantially perpendicular to the ground, a horizontal ice merchandiser with access door(s) oriented substantially parallel to the ground or floor, and the like. Generally, the two-door embodiment of the ice merchandiser 100 includes a housing 110, a first door 120 and a first handle 123, a second door 122 and a second handle 124, a panel 130, a cooling system 140, and an input/output device 150. Other features of the ice merchandiser are described more fully herein. In regard to FIGS. 1-3, FIG. 1 depicts the first door 120 and second door 122 in the full close position, FIG. 2 depicts the first door 120 in the full open position and the second door 122 in the full close position, and FIG. 3 depicts the first and second doors 120, 122 in the full open position. For clarity and ease of explanation, FIGS. 1-3 are described collectively below.

As mentioned above, the ice merchandiser 100 may be located in outdoor environments. Accordingly, in certain embodiments, the housing 110 is constructed from weather-resistant materials (e.g., stainless steel). In this regard, when the ice merchandiser 100 is placed in the outside environment, degradation of the ice merchandiser 100 from various weather conditions (e.g., rain) is substantially prevented. In various other embodiments, the housing 110 may be constructed from any suitable material that insulates the cavity 180 and/or substantially protects the ice merchandiser from degradation (e.g., steel, insulating foam, etc.). As described more fully below, the housing 110 may include a panel 130 and a crown 111 positioned vertically above the panel 130 and coupled thereto. In one embodiment, the panel 130 and crown 111 are of unitary construction (i.e., a single piece or component) while in another embodiment, the panel 130 and 111 are coupled together and are separate components.

The panel 130 may be made out of any suitable material structured to aid insulation of the cavity 180. According to one embodiment, the panel 130 is constructed from any material that is able to withstand or substantially withstand exposure to extended periods in outdoor environments (e.g., rain, snow, sleet, sunlight, etc.). In one embodiment, the panel 130 is constructed from one or more composite materials (e.g., plastics such as polyethylene, rubber, etc.). In other embodiments, the panel 130 is constructed from one or more weather-resistant metals or alloys (e.g., stainless steel). The crown 111 may be constructed the same or similar to the panel 130 (i.e., composite materials, metal or alloys, some combination therewith, etc.). Therefore, in certain embodiments, the ice merchandiser 100 is constructed from both a metal and composite materials.

In the example configurations depicted, the ice merchandiser 100 includes a first door 120 and a second door 122. Each of the doors 120, 122 are movable between a first position and a second position. FIG. 1 depicts the first door 120 and the second door 122 in the first position. The first position refers to a closed position of the doors. In the first position, access to a cavity 180 defined by the housing 110 (see FIG. 3) is substantially prevented via the doors 120, 122 substantially covering openings 170, 171 (see FIG. 3). Thus, the doors 120, 122 are proximate the housing 110 and openings 170, 171 in the first position. In the second position, the doors 120, 122 are spaced apart from the openings 170, 171 and housing 110. The second position refers to an open position. In the second position, access to the cavity 180 is permitted through one or more of the openings 170, 171 due to one or more of the doors 120, 122 being moved away from the housing 110. In operation, a user may grab one of the handles (e.g., first handle 123) to pull one of the doors (e.g., first door 120) away from the housing 110 in order to gain access to the cavity 180. In FIG. 2, the first door 120 is in the open position while the second door 122 is in the closed position. In FIG. 3, both doors 120, 122 are in the open position. It should be understood that in other ice merchandiser configurations, more than two or less than two doors may be utilized. The two-door embodiment shown and described herein is for example purposes only with all such variations intended to fall within the spirit and scope of the present disclosure.

The ice merchandiser 100 is shown to include a cooling system 140. The cooling system 140 is structured to cool the cavity 180 to a desired temperature (e.g., maintain a cavity temperature at or below the melting temperature of ice to substantially prevent the ice product from melting). The cooling system 140 may include any type of components for cooling the cavity 180. In turn, the cooling system 140 may include, but is not limited to, one or more compressors, evaporator coils, condenser coils, conduit, valves, fan(s), a refrigerant source, etc. Although FIGS. 1-2 depict the cooling system 140 located in the bottom of the housing 110, the cooling system 140 may be located in any suitable position that enables the cooling system 140 to cool/refrigerate the cavity 180. For example, the cooling system 140 may be located near the top of the housing 110. In this regard, the crown 111 may conceal and shield and/or mostly conceal and shield the cooling system 140.

As mentioned above, the housing 110 is shown to include a panel 130. The panel 130 is structured to aid insulation of the cavity 180 defined by the housing 110. As shown, the panel 130 is coupled to the first and second doors 120, 122. In other embodiments, the doors 120, 122 may be coupled directly to the housing 110. The panel 130 includes a left side 131 and a right side 132. As shown, the panel 130 substantially surrounds the housing 110. In this example, left side panel 131 and right side panel 132 are separated by a gap. The input/output device 150 is located in this gap defined by the left and right side panels 131, 132. The panel 130 also defines openings 170, 171 across the front of the panel 130 that provide access to the cavity 180 (the openings 170, 171 are also defined by the housing 110). In various other embodiments, the panel 130 may extend across the entire (or most of) the front of the housing 110, such that there are no left and right panels. In other embodiments, the ice merchandiser 100 may not include a panel, such as panel 130 (see, e.g., FIG. 3).

As shown, the panel 130 includes an edge 133 that is at an angle relative to a bottom edge 134 of the (left and right side) panel 130. Due to this angle, the edge 133 and bottom edge 134 define a recess 135. The recess 135 is sized and structured to receive at least a portion of a foot (or feet) of a patron(s). In operation, a patron is able to place a portion of their foot (or feet) in the recess 135, such that the recess 135 wedges their foot (or feet) to stabilize the patron as they reach through an opening into the cavity 180 to remove one or more ice products. Due to the ice products varying in size and weight (e.g., three-pound to twenty-pound bag), a patron bends over, reaches in the cavity, and typically stabilizes the lifting of one or more bagged ice products via his/her back. This may cause strain, injury, and pain to the user. Accordingly, the recess 135 may substantially prevent his/her feet from slipping to ensure stability, such that the patron need not rely as heavily on their back to lift and remove the bagged ice product.

As described herein below, the input/output device 150 is any device that can receive an input and, in some embodiments, provide an output. In this regard, the input/output device 150 may include a display 151 and a payment receptor, shown as a card reader 152. The display 151 may be configured as a touchscreen or any other type of screen. The card reader 152 may be adapted for receiving a card (e.g., debit card, credit card, gift card, etc.) for paying for the ice product stored by the merchandiser 100. In this regard, the card reader 152 may be communicably and operatively coupled to a payment processing system (e.g., credit-card network). In other embodiments, the input/output device 150 may include a cash/coin receptor/provider for receiving and providing cash/coins for facilitating an ice product transaction. In this regard, a patron may pay for the ice product using means other than a card. In some embodiments, the input/output device 150 may include one or both of the card reader 152 and the cash receptor/provider.

Figure 23:
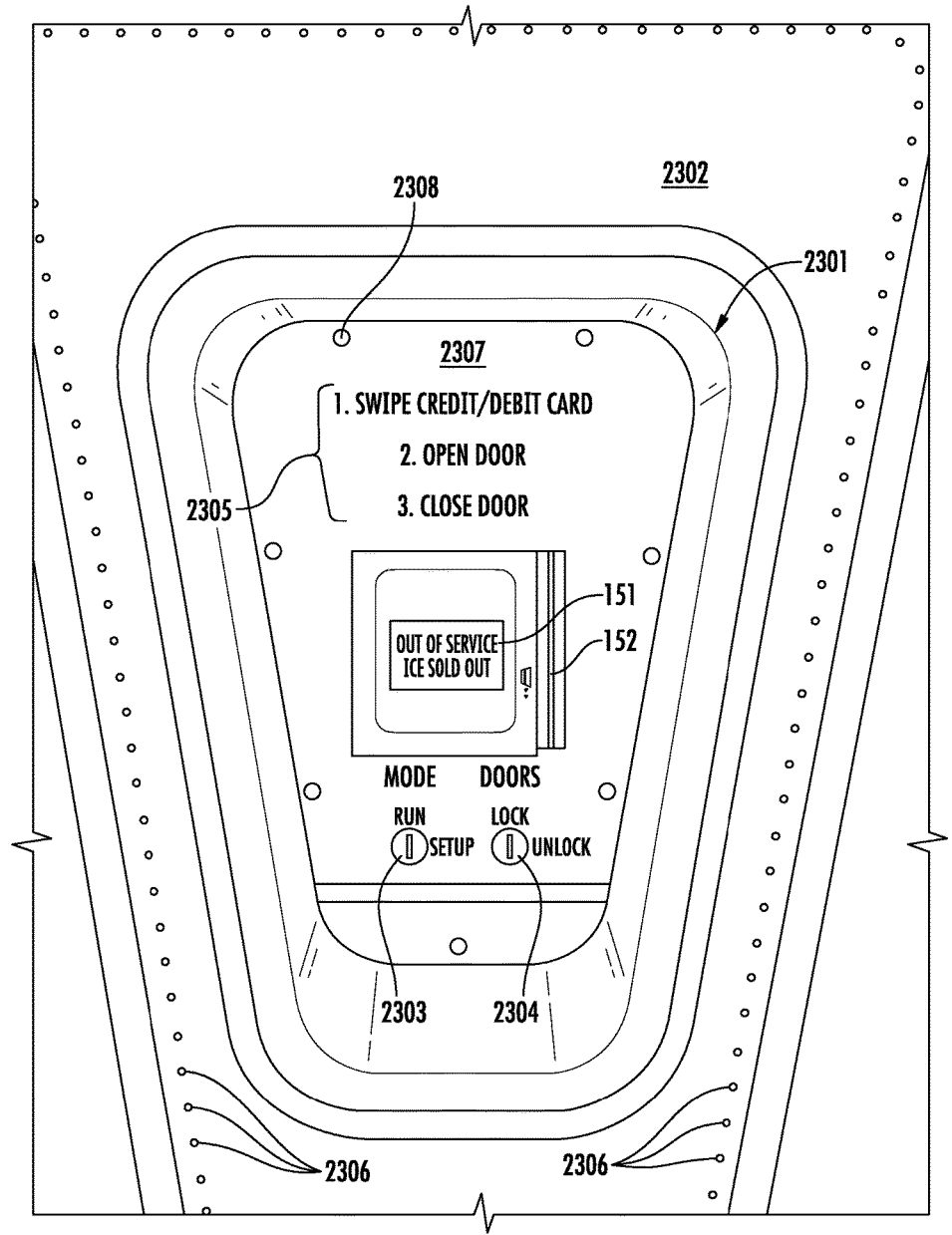
FIG. 23 is an enlarged view of an input/output device for an ice merchandiser, according to one embodiment.

An example configuration for an input/output device for the ice merchandiser is shown in FIG. 23. As shown in FIG. 23, the input/output device includes the display 151 and the card reader 152, where the display 151 is positioned above the card reader 152. The display 151 may be used to provide any information desired (e.g., pricing information for the ice product, discounts, current sales, an inventory status like shown, etc.). The display 151 may also be used by the patron to input information, such as verification information for using the card reader 152 (e.g., zip code, security code, etc.). As shown in FIGS. 1 and 23, the surface 2302 between the doors 120, 122 defines a recess 2301. Placing the input/output device 150 within the recess 2301 on a surface 2307 provides shielding to the input/output device 150 from weather elements (e.g., rain, etc.) and provides security for users who desire privacy when using the ice merchandiser 100. As also shown in FIG. 23, insignia comprising directions 2305 for use may be placed on the surface 2307 housing the input/output device 150. Moreover, the surface 2307 is shown to be attached to the housing via a plurality of fasteners 2308 (e.g., screws, welds, rivets, etc.). However, in other embodiments, the surface 2307 may be applied via an adhesive to the housing of the ice merchandiser or be integral with the housing (e.g., a one-piece component). To ease use of the vended ice merchandiser, a plurality of lights 2306 are shown to surround the surface 2307. These lights 2306 (e.g., LEDs, etc.) may be pre-programmed to activate during periods of low-ambient light. Further, the lights 2306 may provide ornamentational and an appealing feature to the ice merchandiser, such that the pattern and arrangement of the lights is highly configurable. The same is true in regard to the surface 2307 relative to the surface 2302 and the recess 2301: the shape and size of this surface 2307 is highly configurable and may change from application-to-application.

In certain instances, managerial control may also be provided via the system (i.e., access to control certain operations of the ice merchandiser that is only allowed to certain users). In the example shown in FIG. 23, a mode control device 2303 is shown. The mode control device 2303 is adapted to place the control system (e.g., controller 960) for the merchandiser 100 into a "run" mode or a "setup" mode. The "run" mode indicates that the ice merchandiser is operational. That is to say, a user may use the financial payment system to purchase ice product at the ice merchandiser 100. In comparison, the "setup" mode may be used by the user to define the run mode provisions (e.g., cost-per-unit mass, when alerts are provided to refill the merchandiser, how alerts are provided (e.g., email, text message, etc.), when the door(s) lock, etc.). Further, the example of FIG. 23 is also shown to include a lockout device 2304. The lockout device 2304 is movable between a door unlock position and door lock position. In this regard, the manager or user may permanently hold the doors(s) lock or unlocked (e.g., keep the doors unlocked while the merchandiser is stocked). As shown, each of the lockout device 2304 and the mode control device 2303 are key actuated (e.g., a user uses a key to rotate between the aforementioned positions). These keys may be different in structure or the same depending on the level of control desired by the manager or operator of the ice merchandiser 100. In other embodiments, other actuation devices can be used. For example, a touchscreen may be used that has a biometric security device (e.g., thumbprint scanner) and/or passcode security device (e.g., an alphanumeric code, etc.) that allows a manager or other designated user to access the mode controls or door lock/unlock controls. In another example, the actuation device may be a key FOB, where access to the controls is based on the key FOB being within a predefined distance of the merchandiser 100. In this regard, a designated user may be in control of the key FOB in order to restrict access to the control system of merchandiser 100. In still another example, the actuation device may be another card reader, where the another card reader is configured to receive an access card. The access card (as well as the key FOB, passcode and/or biometric devices, etc.) may have different privileges that define what the designated user may access and consequently control (e.g., only the door lock/unlock control, both the setup and door unlock/lock controls, etc.). Accordingly, those of ordinary skill in the art will appreciate that other actuation devices may also be used. Other features of the input/output device 150 are described more fully herein below.

As mentioned above, the housing 110 defines a cavity 180 (see, e.g., FIG. 2). The cavity 180 is structured as an interior volume for receiving, storing, and supplying the ice product. Depending on the type of and application for the ice merchandiser 100, the size and shape of the cavity 180 may vary. For example, the cavity 180 may have forty cubic feet capacity, forty-six cubic feet capacity, seventy-five cubic feet, etc. Moreover, the cavity 180 may be compartmentalized with one or more walls between adjoining cavities. In some instances, each sub-cavity may be designed to hold a different ice product and the sub-cavity shapes may vary (e.g., square prism, rectangular prism, etc.). Furthermore, based on the size of the cavity 180, the number of bagged ice products may vary from application-to-application.

Similar to the bottom or lower recess 135, as shown in FIG. 1, the panel 130 and crown 111 define a gap 112 (e.g., crevice, cavity, recess, etc.). In one embodiment and as shown in FIG. 2, the gap 112 may receive an illuminator 113. The illuminator 113 may include any type of illumination source including, but not limited to, a bulb, a light emitting diode (LED), a glow-in-the-dark strip, etc. Beneficially, the illuminator 113 may provide a visually aesthetic feature as well as illuminating any signage included on the crown 111 (e.g., "ICE", branding, trademarks, etc.). Further, when the cooling system 140 is positioned on top of the merchandiser 100 (e.g., behind the crown 111), the illumination from the illuminator 113 may function to hide the cooling system 140 thereby improving the visual aesthetics of the merchandiser 100.

As shown in FIG. 3, the ice merchandiser 100 includes a platform 175 (or, e.g., shelving system) located within the cavity 180 that supports the ice product. According to one embodiment, the ice product is bagged ice, which is shown as bagged ice 300, 301 to represent the variety of different ice products that may be stored by the ice merchandiser (e.g., a one-pound bag of ice, a three-pound bag of ice, a seven-pound bag of ice, etc.). As shown, the platform 175 and cavity 180 extend between the two access openings 170 and 171. As mentioned above, in various other embodiments, the cavity 180 may be split up into compartments and separated by one or more walls or boundaries within the cavity 180. In this regard, different ice products (or, other products, such as food) may be stored within each cavity or enclosure. All such cavity configurations are intended to be within the spirit and scope of the present disclosure.

Ergonomic Features

As mentioned above, a recess 135 defined by two edges of the panel 130 (or, by an edge 133 of the panel and a bottom edge of the housing 110) may provide stability to a user to ease retrieval of the ice product. While the recess 135 is one ergonomic feature provided by the ice merchandiser 100 of the present disclosure, the ice merchandiser 100 may include many other ergonomic features as well that are structured to provide convenience to users of the ice merchandiser 100. This convenience may take the form of strain-reduction (e.g., an injury-reducing mechanism, such as a patron not needing to bend over as far due to a self-elevating platform, which is described below) and/or an ease-of-use convenience (e.g., an on-product financial payment system that allows patrons to purchase ice products directly at the ice merchandiser without store clerk interaction, which is also described below). Additional ergonomic features are shown in regard to FIGS. 1-3.

As shown, the door handles 123, 124 are lengthened and positioned at an angle for easier grasping and opening during the ice retrieval process. In FIG. 2, door handle 124 is at an angle 5 relative to a plane 6 that is parallel with a ground surface 7. Moreover, the length 8 of the door handle 124 is substantially the length of the door 120. According to an exemplary embodiment, the handle(s) is configured to improve and facilitate use by the left or right hand of a user. In one embodiment, this is accomplished by the handle(s) being angled away from the opposite door (i.e., handle 124 is angled away from the first door 120). In one-door embodiments, the handle is angled away from the user. As mentioned above, the angled and lengthened door handles facilitate easier control of the door. While these features are indicated by reference numerals in FIG. 2 in regard to the second door 122, it should be understood that the same features may be utilized with the first door 120.

According to one embodiment, the door(s) is set to an ergonomic height 9 relative to a ground surface 7. In one embodiment, the ergonomic height is between approximately twenty-six and thirty-five inches (from a bottom edge of the door to the ground surface 7). Similarly, in one embodiment, the bottom edge of the opening (e.g., openings 170 and 171) is set to an ergonomic height. In one embodiment, this ergonomic height is approximately 31.5 inches. As described below, in one embodiment, the self-elevating platform is structured to maintain a platform height (e.g., height 440 in FIG. 4A) substantially equal to the bottom edge of the opening height relative to a ground surface 7. In a similar regard, to accommodate men and women with relative ease, the input/output device 150 may also be situated at an ergonomic height 10 relative to the ground surface 7. In one embodiment, the ergonomic height 10 is between approximately forty-two and fifty-six inches.

As shown most clearly in FIGS. 4A-4B and 5A-7B, the housing 110 and panel 130 where the doors 120, 122 are situated may be at an angle 12 (FIG. 4A), such that the housing 110 and panel 130 with the doors 120, 122 are angled toward the back 14 of the ice merchandiser 100. In turn, a user may be able to stabilize themselves better as they bend into the cavity 180 to remove the ice product. For example, the user does not need to reach back (away from the back 14 of the ice merchandiser 100) to support themselves on the housing 110 when they bend towards the back 14 of the ice merchandiser. Rather, the user may assume a more natural support position on the housing 110 due to it being at an angle 12 toward the back 14 of the ice merchandiser 100. Furthermore, when the user bends over to remove the ice product, they are less likely to hit their head on the ice merchandiser 100 causing injury.

These and other features described below provide the ice merchandiser 100 of the present disclosure with an ergonomic appeal to potential customers, which may lead to an increase in sales potential.

Self-Elevating Platform

According to one embodiment, the platform 175 is structured as a self-elevating platform structured to elevate to an ice product (e.g., a bagged ice product, such as bagged ice product 300, 301) removal height. When the platform is fully or mostly full loaded (e.g., holding a near maximum amount of weight, quantity, and/or volume of ice products), the platform is at a loaded position. As ice product is removed, the platform self-elevates to aid product retrieval via the openings 170, 171 (i.e., another ergonomic feature of the ice merchandiser 100). In many instances, ice products are stacked upon each other within the ice merchandiser 100. Patrons may be able to relatively easily lift and remove the ice products near the top of the stack, but once only the bottom of the stack of ice products remain, patrons need to increase their reach and/or bend over further in order to lift and remove those ice products. This reaching may cause back strain, injury, and otherwise disinterest the patron in purchasing the ice product. According to the present disclosure, the platform 175 elevates upon the removal of ice products to maintain or substantially maintain the ice product at an ideal product removal height. According to one embodiment, the ideal product removal height (i.e., the ice product removal height) is between approximately (i.e., plus-or-minus two inches) 26 and 35 inches relative to a ground surface 7 that the ice merchandiser 100 rests upon. However, the ice product removal height is highly configurable such that other embodiments may use different product removal heights. In some configurations, more than one self-elevating platform 175 may be included in the ice merchandiser 100. In these instances, the ice product removal height may vary for each platform that holds a different type of ice product in the ice merchandiser 100.

According to one embodiment, the ice product removal height is based on the type of ice product on the platform 175, where different types of ice products have different ice product removal heights. In one instance, heavier bagged ice products have higher ice product removal heights than lighter (weight) bagged ice products. For example, a twenty-pound bagged ice product may have an ice product removal height at approximately 35 inches whereas a three-pound bagged ice product may have an ice product removal at approximately 26 inches. As relatively heavier items (e.g., bagged ice product) may cause a relatively greater amount of strain from lifting them, the self-elevating platform may be structured to elevate these bagged ice products to relatively higher removal heights to reduce the potential for back or other strain. In other embodiments, an opposite configuration may be utilized: relatively lighter bagged ice products are elevated to a height greater or higher than that of relatively heavier bagged ice products. This configuration may be chosen due to the relatively lighter bagged ice products occupying a smaller volume (e.g., the bigger bag is easier to grab than the smaller bag). In still other embodiments, the ice product removal height may be uniform regardless of the ice product stored thereon.

Referring now to FIGS. 4A-7B, various self-elevating platform configurations are shown according to several example embodiments.

Figure 4C:
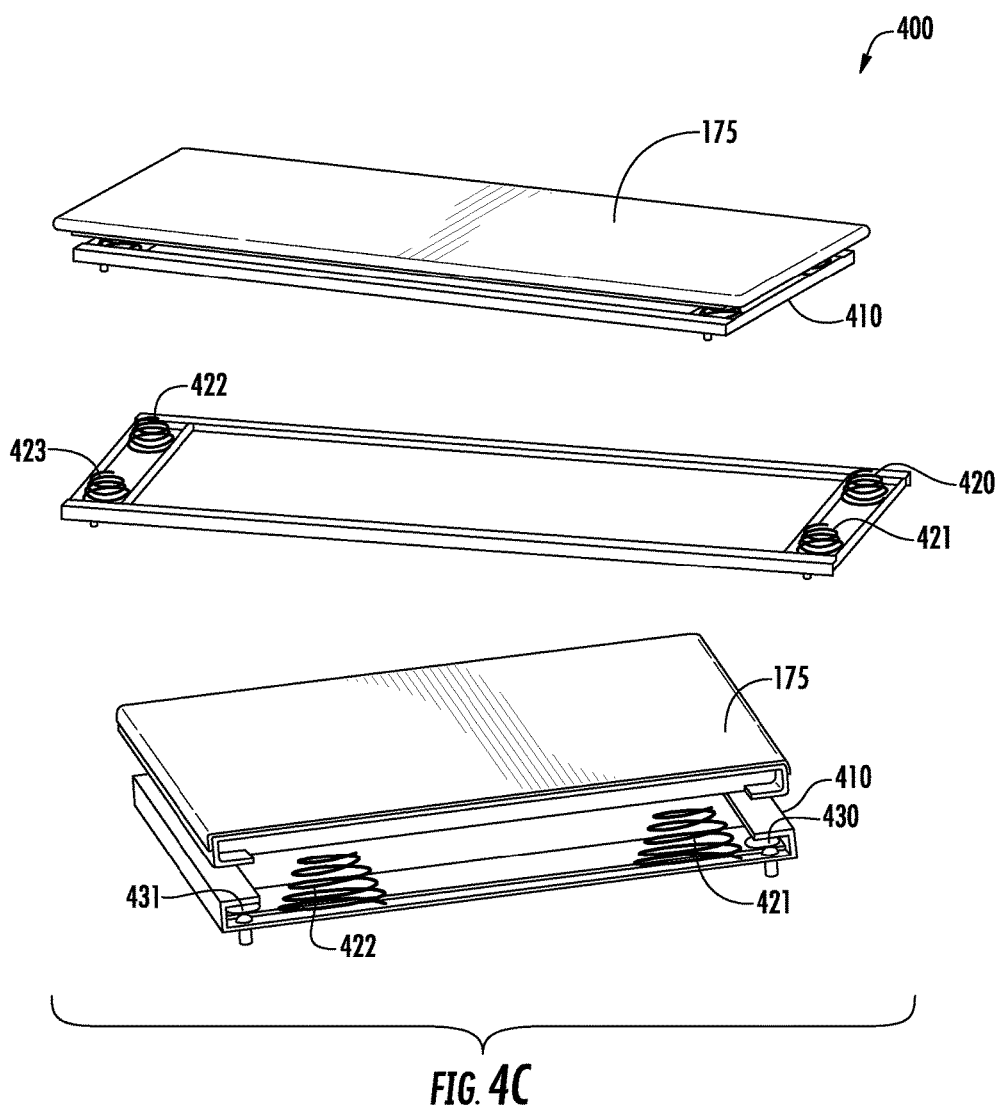

FIGS. 4A-4C depict a spring-actuated self-elevating platform, according to one embodiments. FIGS. 4A-4B depict side cross-sectional views of the ice merchandiser, while FIG. 4C depicts the self-elevating assembly 400 individually. Referring collectively to FIGS. 4A-4C, the self-elevating platform assembly 400 includes a platform 175 and a support frame 410. In this example, the platform 175 is structured as a substantially flat rectangular or square structure. In one embodiment, the platform 175 rests upon actuators 420, 421, 422, and 423, such that the platform 175 is not physically attached to the frame 410. In another embodiment, the platform 175 is coupled (e.g., welded, brazed, glued, or any other joining process) to actuators 420, 421, 422, and 423 to attach the platform 175 to the frame 410. Actuators 420, 421, 422, and 423 are coupled (e.g., welded, brazed, glued, or any other joining process) to support frame 410. In other embodiments, the platform 175 may be attached to any other portion of the support frame 410 as long as the actuators 420-423 are able to move the platform 175. In the example of FIGS. 4A-4C, the actuators 420-423 are structured as springs, such that the platform 175 rests upon four springs located in each corner of the support frame 410. In various other embodiments, the number and location of the actuators may vary. Moreover, other types of actuators may be utilized. Actuator types may include, but are not limited to, hydraulic cylinders, pneumatic actuators, an electric actuator (e.g., an electric motor), a mechanical actuator (like the springs of FIGS. 4A-4C), and the like. For the purposes of the discussion herein in regards to FIGS. 4A-4C, actuators 420-423 will be referred to as springs 420, 421, 422, and 423 (or, springs 420-423). However, as mentioned above, springs 420-423 may be replaced and/or used with one or more other types of actuators previously described.

As shown in FIGS. 4A-4B, the support frame 410 may be coupled to supports 450 and 452. Supports 450 and 452 stabilize and hold the support frame 410 (and, consequently, the platform 175). The supports 450 and 452 may be coupled to the ice merchandiser 100. Although only two supports 450 and 452 are depicted, any number of supports may be used. In some embodiments, no supports may be utilized such that the self-elevating platform assembly 400 rests on or substantially on an interior bottom surface 480 of the cavity 180.

In operation, bagged ice products 300 are loaded on platform 175. The weight of the bagged ice products depresses the springs 420-423 to lower the platform 175 to a loaded position height 440 (relative to a ground surface that the ice merchandiser 100 rests upon). According to one embodiment, the loaded position height 440 is no less than approximately 20 inches relative to the ground surface. As bagged ice products 300 are removed (FIG. 4B), the springs 420-423 expand and elevate the platform 175 to an ice product removal height 442. As mentioned above, according to one embodiment, the ice product removal height may be between approximately 26 and 35 inches in order to provide ergonomic benefit to a patron. In the example shown, the ice product removal height 442 is greater than the loaded position height 440. According to another embodiment, the ice merchandiser 100 may include a window 470 for viewing the ice product within the cavity 180. As shown in FIG. 4B, the ice product removal height 442 is approximately equal to the height of a bottom edge of the window 470 relative to the ground surface. In this regard, ice product may be maintained within the viewing area of the patrons, such that even ice product located near the bottom of a stack that would not otherwise be visible is now clearly displayed to patrons. This may promote sales because the patrons are able to see that the ice merchandiser is stocked with product.

The amount of expansion of the springs 420-423 relative to the loaded position height 440 may vary based on the spring stiffness and spring length chosen. For example, in cases where no supports are used, the spring length may be relatively longer to account for the platform 175 being relatively closer to the bottom surface 480. In certain embodiments, at least one of the spring stiffness and spring length for at least one spring may be different relative to the other springs. For example, springs near the front of the ice merchandiser 100 (i.e., closest to the doors, such as door 120) may be relatively shorter in length than springs near the back of the ice merchandiser 100. As such, as the ice product is removed, the platform 175 elevates at an angle such that the portion of the platform nearest the back 14 of the ice merchandiser is at a height (relative to the ground surface) higher than the portion of the platform 175 nearest the front of the ice merchandiser 100. The angle of the platform 175 may provide additional ergonomic benefits by causing ice products near the back of the ice merchandiser to slide (from gravity) to the front of the ice merchandiser to aid easy retrieval by a patron.

As shown in FIGS. 4A-4C, load sensors (e.g., load cells) are included with at least one of the self-elevating platform assembly 400 and the ice merchandiser 100. The self-elevating platform assembly 400 is shown to include load cells 430 and 431 and the ice merchandiser 100 is shown to include load cells 460 and 461 (not shown are the load cells on the other side of the ice merchandiser and assembly). The load cells are structured to measure, estimate, and/or determine a mass (or weight) on the platform 175. Two locations for the load cells are shown to indicate example locations. According to one embodiment, the load cells (i.e., load cells 460 and 461) are located outside of the cavity 180. In turn, the cool temperature of the cavity 180 is substantially prevented from transmitting to the load cells. This may prevent the cold temperature from having adverse effects on the load cells (e.g., freezing and becoming non-operational). However, in the embodiments of FIGS. 4A-4C, the load cells 430 and 431 are included with the platform assembly 400 that is located within the cavity 180. All variations are intended to fall within the spirit and scope of the present disclosure. The functionality of the load cells with the ice merchandiser 100 is described more fully herein in regard to the financial payment system.

It should be understood that FIGS. 5A-7B include self-elevating platform assemblies according to various other embodiments. However, the ice product removal height (e.g., based on the type of ice product supported, based on a location of a window, an ergonomic value, etc.) feature may be substantially analogous to that described above.

Referring now to FIGS. 5A-5B, a self-elevating platform assembly 500 is shown according to another example embodiment. The assembly 500 is shown to include a cable 505 interconnecting a bin 510 with a spring 515. The assembly further includes a pulley 520 coupled to the housing 110 and a hinge 525 (e.g., pivot point) operatively coupled to the housing 110 and the bin 510. In this regard, the bin 510 may elevate or de-elevate to rotate about the hinge 525. The bin 510 is structured to hold and provide the ice product. The pulley 520 (e.g., sheave, drum, roller, wheel, etc.) and spring 515 are coupled (e.g., one or more fasteners) to interior surfaces of the ice merchandiser 100 within the cavity 180. According to one embodiment, the spring 515 is structured as an axial spring. The pulley 520 translates the downward force applied by a loaded bin to an axial force to pull or expand the spring 515. The cable 505 is coupled to the bin 510 (e.g., via one or more fasteners, welding, brazing, and/or any other joining process). The bin 510 is shown to include a surface 511 that the ice product rests upon. While the bin 510 is shown to be substantially rectangular in shape, any other shape may be used (e.g., triangular prism) as long as the bin 510 is able to store and supply the ice product. According to one embodiment, the bin 510 may be rigid (i.e., non-deformable), such that bin 510 may be constructed from rigid material, such as metal or plastic. Depending on the size and structure of the ice merchandiser, more than one pulley 520, spring 515, and cable 505 may be used. Moreover, more than one bin 510 may be used, such that each bin has its own pulley, spring, and cable assembly. This configuration may be used where the bins are designed to hold different ice products, such that their self-elevation amounts may differ. The length and stiffness of the spring 515 may control the extent of elevation of the bin 510. In some embodiments, the cable 505 may include an elasticity element, such that the cable 505 also impacts the amount of elevation of the bin 510. Accordingly, in certain embodiments, the cable 505 is constructed from a substantially rigid material (e.g., metal cable) while in other embodiments the cable 505 is constructed from an elastic material (e.g., rubber).

In FIG. 5A, the bin 510 is fully loaded with ice product. In FIG. 5B, the bin 510 is nearly empty of the ice product. When the bin 510 is fully loaded, the weight of the ice product causes a downward force (toward the ground surface) that is transmitted via the pulley 520 to pull or expand the spring 515. As the spring 515 expands, the bin 510 rotates in a clockwise direction 550 about the hinge 525 toward the ground surface. The lowest height corresponds with a loaded position height 540 between a bottom surface of the bin 510 and the ground surface. As ice product is removed, the force on the spring decreases causing the spring 515 to contract. The contraction of the spring 515 pulls the cable 505 and causes the bin 510 to elevate by rotating in a counterclockwise direction 552 about the hinge 525 into an ice product removal height 542.

FIGS. 6A-6B depict a self-elevating platform assembly 600 according to another example embodiment. The self-elevating platform assembly 600 includes a cable 605 coupled to a spring 615 and a sling 610. The spring 615 is coupled (e.g., via one or more fasteners or other joining process(es)) to an interior wall of the ice merchandiser 100. As shown, a first end 611 of the sling 610 is coupled to the cable 605 while a second end 612 of the sling 610 is coupled to the a pivot 620. According to one embodiment, the pivot 620 is fixedly attached to the ice merchandiser 100. While the sling 610 is structured to move based on the weight of ice product rested upon it, the pivot 620 remains stationary. While the spring 515 of FIGS. 5A-5B may be structured as an axial type spring (due to the presence of the pulley 520), the spring 615 of FIGS. 6A-6B is structured as a torsional spring. However, the present disclosure contemplates that the spring 615 may be structured as another type of spring (e.g., axial, etc.). When the sling 610 is fully or nearly fully loaded, the downward force from the weighted sling 610 causes a torque on the spring 615 (via cable 605) that causes the spring 615 to twist to permit the sling 610 to extend to a loaded position height 640.

The sling 610 may be structured as any type of non-rigid holding structure for the ice product. For example, the sling 610 may be structured as a tarp, a net, and the like. Thus, the sling 610 may stretch when loaded with the ice product and contract when ice product is removed. As the ice is removed, the sling 610 contracts to an ice product removal height 642, which is approximately the height of the pivot point 620. Accordingly, to adjust the ice product removal height, the pivot 620 attachment point may be adjusted. In this regard, the ice merchandiser 100 may be re-configurable based on the type of ice product supplied (e.g., larger and heavier ice products may correspond with a pivot height higher than smaller and lighter ice products).

Referring to FIGS. 7A-7B, a self-elevating platform assembly 700 is depicted, according to another example embodiment. The assembly 700 includes a channel 705 connected to a spring 715. The spring 715 is coupled (e.g., via one or more fasteners, brackets, etc.) to the ice merchandiser 100. The channel 705 is also coupled to a platform 710. The platform 710 includes a top surface 711 that is structured to receive and supply an ice product to a patron. According to one embodiment, the platform 710 includes rollers 720 and 722 (e.g., wheels, casters, etc.) that couple the platform 710 to the channel 705. As shown, the platform 710 is triangular prism shaped with the top surface 711 slanted towards the front of the ice merchandiser 100 (i.e., toward the door 120). The slant of the top surface 711 provides an ergonomic benefit to patrons because ice products placed on the top surface 711 are inclined to slide or move towards the front of ice merchandiser 100. As such, patrons need not reach as far into the ice merchandiser 100 to retrieve the ice product, which may alleviate strain from stretching to obtain the ice product.

In operation, bagged ice is placed atop the top surface 711. When fully loaded, the top surface 711 is at a loaded height 740 relative to a ground surface (e.g., support surface) supporting the ice merchandiser 100. As bagged ice is removed, the platform 710 elevates. While the channel 705 is substantially ridged, according to one embodiment, the spring 715 is coupled to the platform 710 via one or more cables (e.g., rope, string, line, etc.). In this instance, the spring 715 is structured as a torsion spring, such that when bagged ice is placed on the platform 710, the spring 715 twists to unravel/release the cable and permit the platform 710 to travel to the load position height 740. As bagged ice is removed, the spring 715 twists in an opposite direction to wind the cable and pull the platform upward to (eventually) the ice removal height 742. The rollers 720, 722 engage with the channel 710 to ensure or substantially ensure that the platform 710 may only move in an upward and downward direction.

While described above in regard to FIGS. 4A-4C, it should be understood that each embodiment depicted in FIGS. 5A-7B includes load cells with the ice merchandiser 100 (i.e., load cells 530, 531, 630, 631, 730, and 731). In each instance, the load cells are located external to the cavity 180 to shield the cold temperature of the cavity from the load cells. As mentioned above, the function and interconnection of the load cells is explained more fully below.

Figure 8:
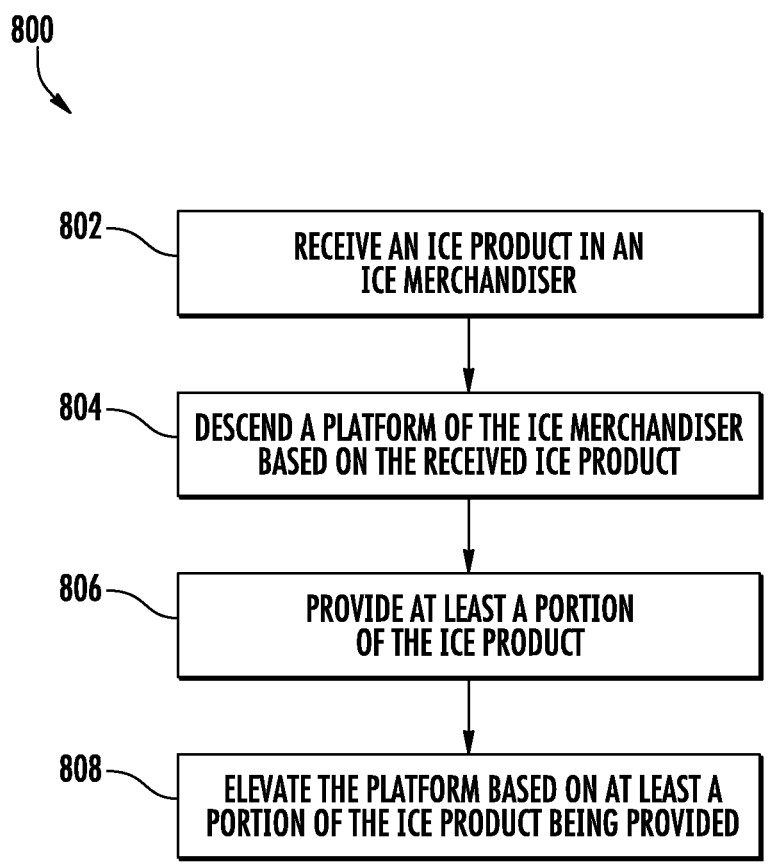
FIG. 8 is a flowchart of a method of operating an ice merchandiser with a self-elevating platform, according to one embodiment.

With the aforementioned structural description of self-elevating platform assemblies according to various embodiments, an example method of operation is depicted in FIG. 8. FIG. 8 shows a flow chart of a method 800 of adjusting a height of a platform that holds an ice product in an ice merchandiser, according to one embodiment. At step 802, an ice product is received in an ice merchandiser. According to one embodiment, the ice product corresponds with bagged ice. The bagged ice may come in any shape and size (e.g., a three pound bag, a five pound bag, a twenty-five pound bag, etc.). Based upon the reception of the ice product, a platform of the ice merchandiser descends (step 804). The platform may be structured as any type platform shown in the aforementioned embodiments (e.g., platform 175 with assembly 400, bin 510, sling 610, and platform 710). At step 806, at least a portion of the received ice product is provided. For example, a patron may open a door of the ice merchandiser and retrieve a portion of the ice product. Based on at least a portion of the ice product being provided, the platform is elevated (step 808). According to one embodiment, the platform is elevated to an ice product removal height that corresponds with between approximately 26 and 35 inches. At this height, patrons need not overly bend over to retrieve the ice product, which may alleviate strain, pain, and the likelihood of injury. According to another embodiment, the ice product removal height corresponds with a height of a window on the ice merchandiser, such that ice product is viewable via the window from a patron viewing the window at an orthogonal angle (i.e., not peering into the window at an angle to see the bottom of the ice merchandiser). This permits patrons located a distance away from the ice merchandiser to still view the ice product. According to still another embodiment, the ice product removal height may vary based on the type of ice product held by the platform (e.g., relatively heavier ice products have a relatively higher ice product removal height). Moreover, method 800 may be implemented with ice merchandisers including more than one self-elevating platform, with each platform have the same or different ice product removal heights. All such variations are intended to fall within the spirit and scope of the present disclosure.

Control System for Ice Merchandiser

Figure 9:
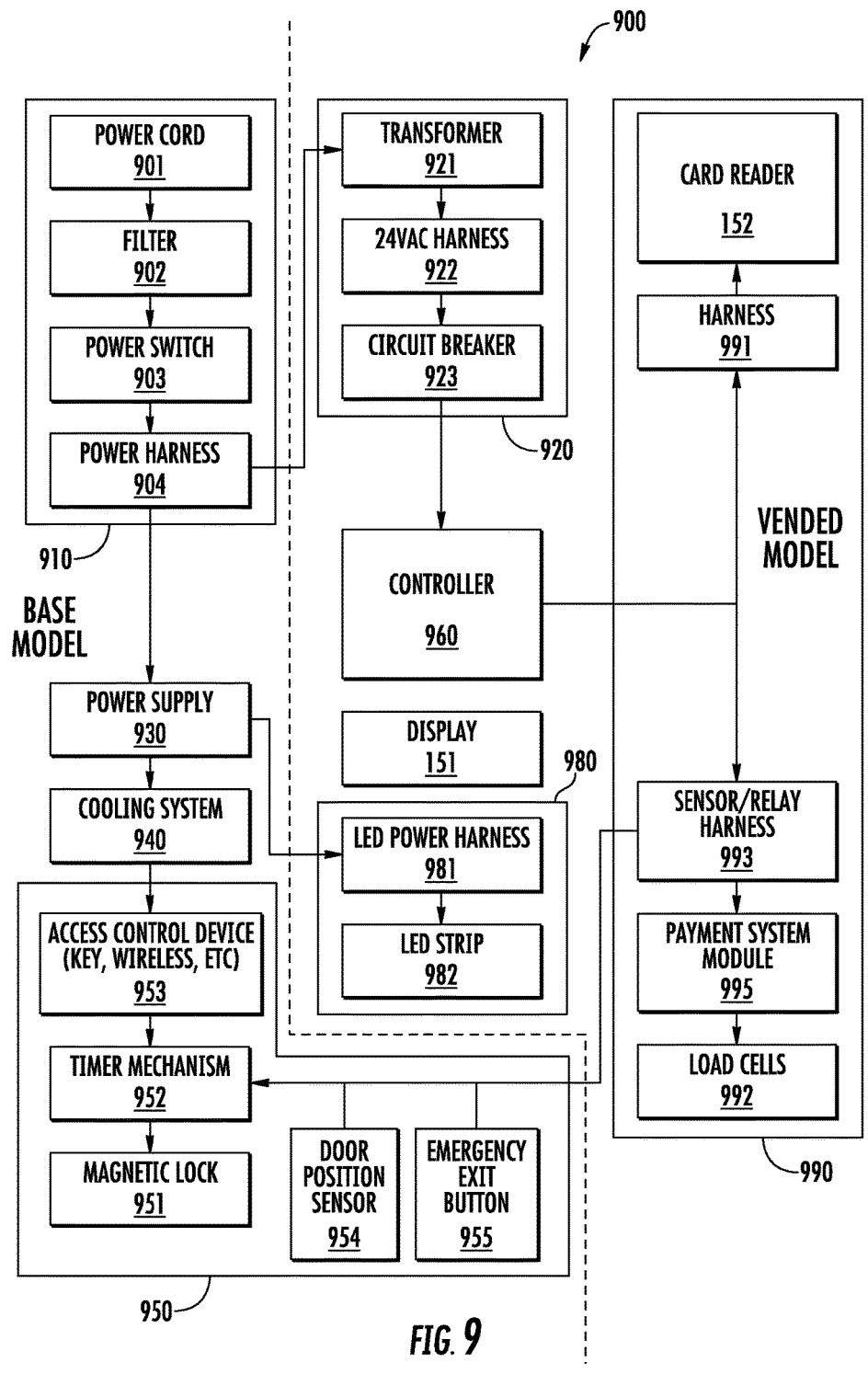
FIG. 9 depicts a schematic block diagram of the components of the ice merchandiser, according to various embodiments.

Referring now to FIG. 9, a schematic block diagram 900 of the components of the ice merchandiser according to various embodiments is shown according to one embodiment. The components depicted in diagram 900 may be utilized with the ice merchandiser described herein. Accordingly, the diagram 900 may be explained in regard to FIGS. 1-7B. As shown, the block diagram 900 is separated into a "base model" and a "vended model." The "vended model" refers to an ice merchandiser with an on-product financial payment system that enables users/customers to purchase ice product directly from the ice merchandiser. The vended model includes the same components as the base model, except for the addition of the on-product financial payment system. A vended model is depicted in FIGS. 1-2, while a base model is depicted in FIG. 3.

As shown, both the base and vended model include an incoming power system 910 coupled to a power supply 930, a cooling system 940, and an access control system 950. The incoming power system 910 is structured to electrically couple the ice merchandiser to an external power source (e.g., a power outlet). Accordingly, the incoming power system 910 includes a power cord 901, a filter 902, a power switch 903, and a power harness 904. The power cord 901 provides an electrical conduit (e.g., one or more cables, wires, etc.) to relay power from the external source to the ice merchandiser. According to one embodiment, the power cord 901 is structured as a ground fault circuit interrupter (GFCI) power cord in order to substantially prevent an electric shock risk. According to other embodiments, the power cord 901 may be structured as any type of power cord capable of relaying power from the external power source. The power cord 901 is electrically coupled to the filter 902. The filter 902 is structured to dissipate, reduce, and/or otherwise minimized electromagnetic interference in the system. According to one embodiment, the filter 902 is structured as a radio-frequency interference (RFI) filter. In other embodiments, the filter 902 may be configured as any type of electromagnetic interference filter. The filter 902 is electrically coupled to the power switch 903. The power switch 903 is a button, switch, or any other control mechanism that either stops (i.e., an OFF position) or permits (i.e., an ON position) electricity from the power cord 901 and filter 902 from traveling to the power harness 904. The power harness 904 is any type of power cord or wiring harness that electrically connects the ice merchandiser to the rest of the incoming power system 910 components.

As shown, the power harness 904 is electrically coupled to both an alternating current (AC) power system 920 for the ice merchandiser and a power supply 930. The AC power system 920 and power supply 930 are included in the vended model of the ice merchandiser. According to the example embodiment depicted, only the power supply 930 is included with the base model. According to one embodiment, the power supply 930 is structured as a direct current (DC) power supply. Accordingly, the power supply 930 may include any type and number of electrical components used to provide DC to one or more components (e.g., a rectifier to rectify AC power from the wall outlet, one or more batteries, etc.). The power supply 930 is structured to provide power to one or more components included with the cooling system 940 and the access control system 950. Accordingly, the power supply 930 may be sized to provide adequate power to both of these sub-systems. According to one embodiment, the power supply 930 is structured as a 24 volt power supply. The access control system 950 is described under the Access Control System Section herein.

The cooling system 940 is structured to be analogous to the cooling system 140 described herein. Accordingly, the cooling 940 may include any of the components (e.g., compressor, coils, valves, etc.) described above and be designed to function like the cooling system 140 described above.

Referring now to the vended model components, as mentioned above, the incoming power system 910 may be coupled to the AC power system 920 of the ice merchandiser. The AC power system 920 is structured to provide AC power to one or more components of the ice merchandiser. The AC power system 920 is shown to include a transformer 921, a harness 922, and a circuit breaker 923. The transformer 921 electronically couples the AC power system 920 to the incoming power system 910. The transformer 921 may be structured as any type of transformer including, but not limited to, an autotransformer, a polyphase transformer, and the like. The transformer 921 provides electricity to the harness 922 which, via the circuit breaker 923, provides electricity to the controller 960. As shown, the harness 922 is structured as a 24 Volt AC harness. However, in other embodiments, the harness 922 may be structured to support any type of voltage and current (e.g., 48 Volt AC, 12 Volt AC, etc.). The circuit breaker 923 may be structured as any type of circuit breaker 923 that interrupts/disconnects current flow if a fault condition occurs. The harness 922 may include any type of wire (e.g., cable, conduit, etc.) that is capable of transmitting electricity.

As also shown, the vended model may include a display 151 (e.g., the display 151 of input/output device 150 of FIGS. 1-3). Accordingly, the display 151 may provide various types of information to a user or customer of the ice merchandiser 100 (e.g., types of ice products housed by the ice merchandiser, cost of each product, types of payments accepted, instructions for how to use the ice merchandiser, a terms and conditions window, etc.).

The vended model may also include a lighting system 980. The lighting system 980 may provide illumination or backlighting to one or more components on the ice merchandiser 100 (e.g., signage, lighting around the display (i.e., input/output device 150) to aid vision, backlighting in the cavity 180, backlighting around the doors, etc.). For example, strip lights may substantially surround each door opening. As shown, the lighting system 980 is structured as a light-emitting diode (LED) system. The LED system includes a harness 981 electronically coupled to the power supply 930 and to LED strips 982. In various other embodiments, the lighting system 980 may be structured as any type of lighting system (e.g., fluorescent), such that it may be powered by AC (e.g., power system 920) or DC (power supply 930) power systems.

As shown, the controller 960 is coupled to the financial payment system 990. The financial payment system 990 includes card reader 152 of input/output device 150, harness 991, load cells 992 (e.g., load cells 530, 531, 630, 631, 730, and 731), a payment system module 995, and a harness 993. Explanation of the financial payment system 990 is described under the Financial Payment System Section herein.

While FIG. 9 separates components by model (e.g., vended and base), it should be understood that this demarcation is not meant to be limiting, such that in some embodiments more or fewer components than those shown in FIG. 9 may be used with each model. Similarly, with the exception of the financial payment system 990, the base model may include components that are shown as only being included with the vended model (e.g., a display 151 may be included with the base model). All such variations are intended to fall within the spirit and scope of the present disclosure.

Access Control System

The access control system 950 is structured to control access to the cavity 180 of the ice merchandiser 100. As mentioned above, many ice merchandisers are situated outside of convenient stores (e.g., a fuel stop) and are left unattended. While this outside environment location is convenient to patrons, the ice product stored by the ice merchandiser may be vulnerable to theft due to the lack of monitoring and the outside environment. According to the present disclosure, an access control system, such as access control system 950, is implemented with the ice merchandiser to substantially prevent unauthorized ice product removals from the ice merchandisers. In turn, profitability of the ice merchandiser may also increase.

In certain embodiments, the access control system 950 is coupled to the financial payment system 990. Accordingly, the access control system 950 is structured to selectively provide access to the ice merchandiser 100 based on the financial payment system 990 receiving confirmation that payment is approved or validated (e.g., the payment card is verified/authorized, a user purchases the ice product at a location remote from the ice merchandiser and receives an access code that upon entering gives them access to the ice merchandiser, a remote access control device may actuate the unlock button as in FIG. 10B upon payment, etc.). In this regard, access to the ice merchandiser 100 is limited to paying customers.

The access control system is shown generally in regard to FIG. 9. As shown, the access control system 950 includes locks 951 (e.g., locks 160, 161, 163, and 164 of FIGS. 2-3), a timer mechanism 952, an access control device 953, a door position sensor 954 (e.g., door position sensors 190 and 191 of FIG. 3), and an emergency exit device 955 (e.g., emergency exit devices 162 and 165). While these features are generally shown in FIG. 9, an example implementation of such features is shown in regard to FIGS. 1-3. Accordingly, the access control system 950 may be explained herein below in regard to FIGS. 1-3.

As shown, in FIGS. 1-3, the ice merchandiser 100 includes a lock 160 selectively lockable with a lock 161 for the first door 120 and a lock 163 selectively lockable with a lock 164 for the second door 122. When locked, the engaged locks 160 and 161 prevent the first door 120 from opening to provide access to the cavity 180. Similarly, when locked, the engaged locks 163 and 164 prevent the second door 122 from opening to provide access to the cavity 180. Accordingly, in the first position of doors 120, 122, the locks 160 and 161 are engaged and the locks 163 and 164 are engaged. In the second position of the doors 120, 122, the locks 160 and 161 and the locks 163 and 164 are disengaged thereby allowing the doors 120, 122 to be movable. According to one embodiment, locks 160 (for the first door 120) and 163 (for the second door 122) are situated outside of the cavity 180. As shown, the locks 160 and 163 are located on the panel 130 of the ice merchandiser. The corresponding locks, locks 161 and 164, are situated on the first and second doors 120 and 122, respectively. As shown, the locks 161 and 164 are positioned on the doors 120 and 122 below the openings 170 and 171. Accordingly, like locks 160 and 163, locks 161 and 164 are situated outside of the cavity 180. By locating the locks 160, 161, 163, and 164 outside of the cavity 180, the relative cool temperatures of the cavity 180 are insulated from the locks thereby substantially preventing any malfunctioning of the locks from the relatively cold environment.

In the example depicted, each door 120, 122 may be selectively and independently actuable between a locked position and an unlocked position. However, in other embodiments, the doors 120, 122 are actuable in unison. That is to say, an unlock command unlocks each door 120, 122 simultaneously or nearly simultaneously. In this regard, the doors 120, 122 may be controlled together.

According to one embodiment, the locks 160, 161, 163, and 164 are structured as electromagnetic locks. In this configuration, the power supply 930 provides power to the locks to energize the locking pairs (e.g., locks 160 and 161). To unlock the door, power is ceased to de-energize the locks. According to one embodiment, the electromagnetic locks may include a fail-safe feature, such that when no power is present (e.g., a power blackout), the locks revert to a disengaged (de-energized) state. Therefore, access to the cavity 180 may still be permitted. According to one embodiment, the electromagnetic lock may surround the opening of the cavity 180 covered by the door (e.g., opening 170). In this configuration, energization of the lock (i.e., plate) may cause a relatively tighter seal between the door and the ice merchandiser thereby aiding insulation of the cavity 180. This configuration may be implemented by installing a metal plate that surrounds the opening on the panel 130 (and/or housing 110) that is energizable to lock with a corresponding metal plate in the door. This embodiment is depicted in FIG. 3, where locks 160 and 163 are structured as metal plates that surround (in some embodiments, substantially surround) openings 170 and 171, respectively. Locks 161 and 164 are structured as metal plates that substantially match/coincide with locks 160 and 163, respectively, when the doors 120 and 122 are in the closed position. By creating a magnetized lock around the openings, as mentioned above, a relatively tighter seal for the cavity 180 may be achieved.

In some other instances, the entire door may be made out of metal while in other instances, select areas may be constructed from metal (e.g., only a metal plate that corresponds with the metal plate on the housing 110 and/or panel 130). When the door is not fully constructed from metal, the door may also be constructed from composite materials, such as plastic, in order to reduce its mass. As such, patrons may be able to operate the door in a relatively easier fashion. Moreover, if the patron is reaching into the cavity 180, the lighter weight door, should it move toward the first position, will not impact the patron with as much force due to its lighter weight thereby reducing the likelihood of injury. When embodied as electromagnetic locks, the doors 120 and 122 do not require a patron to move them into the first position (i.e., the closed position). Rather, the magnetization force between the doors 120, 122 and the housing 110 and/or panel 130 "pull" or draw the doors 120, 122 to the housing and/or panel 130 (depending on where the corresponding metal plate is situated). Rather, a user may only need to place the door substantially in the first position and not need to push the door shut (i.e., fully closing the door in the first position). "Substantially" may refer to any door-to-ice merchandiser position that enables a magnetization force to be created between the locks and pull the door all the way shut. Accordingly, based on the strength of the electromagnetic locks used, this "substantial" position may vary based on the application.

In certain other embodiments, one or more biasing members may also be included with the ice merchandiser 100. The biasing members are structured to bias the door(s) towards the first position. When the locks are structured as electromagnetic locks, the biasing members are structured to bias the door(s) in the substantial first position as described above. The biasing members may include, but are not limited to, springs, additional magnets, weighting of the door (e.g., one or more off-centered weights) that push the door to the first position, and the like.

While the locks 160, 161, 163, and 164 are described above as being electromagnetic locks, many other type of locking devices may be used with the ice merchandiser (e.g., a padlock, a bar-latch locking mechanism, etc.). Furthermore, it should be understood that the number and position of the locking devices included with the ice merchandiser may vary based on the application and configuration of the ice merchandiser (e.g., an ice merchandiser with only one door may only use one locking device pair). All such variations are intended to fall within the spirit and scope of the present disclosure.

The ice merchandiser 100 is also shown to include emergency exit devices 162 and 165. The emergency exit devices 162 and 165 are structured to unlock the locks 160, 161, 163, and 164 to permit movement of the doors 120 and 122. In operation, should a user fall into the cavity 180 and the door(s) become locked, the emergency exit devices 162 and 165 permit opening of the door(s) to prevent the user from becoming trapped. The emergency exit devices 162 and 165 are shown as being situated on the first and second doors 120 and 122, respectively. However, in other embodiments, the emergency exit devices 162 and 165 may be placed in other locations in the cavity 180. The emergency exit devices 162 and 165 may also include one or might lighting devices (e.g., via lighting system 980) to illuminate the devices when the doors 120 and 122 are in the first position.

The ice merchandiser 100 may also include door position sensors 190 and 191. Door position sensor 190 is structured to determine the position of the first door 120 and door position sensor 191 is structured to determine the position of the second door 122. In this regard, the door position sensors 190, 191 may acquire data indicative of a position of the doors 120, 122 and, in response, determine a position a position of the doors 120, 122. In another embodiment, the door position sensors 190, 191 may acquire data indicative of a position of the doors 120, 122 and provide that data to the controller 960, where the controller 960 determines a position of the doors 120, 122.

The position of the door may range from the fully closed to the fully open position. Accordingly, in one embodiment, the door position sensors 190, 191 may acquire data indicative of the doors 120, 122 being either closed or not closed (i.e., binary). This embodiment may be useful for remote monitoring in determining a quick status of the doors 120, 122 (i.e., whether one or more of the doors are open or closed). In other embodiments, the door position sensors 190, 191 may acquire data indicative of a relatively more precise location of the doors 120, 122 (e.g., an angle of opening with respect to a face of the ice merchandiser, a distance away from the opening, etc.). This embodiment may be useful for attendants who require relatively more precision in monitoring the ice merchandiser 100 (e.g., a remote attendant of the ice merchandiser).

In certain embodiments, the controller 960 controls engagement of the locks (e.g., locks 160 with 161 and locks 163 with 164) by providing one or more lock and unlock signals, commands, instructions, etc. (e.g., energize the electromagnetic locks to lock the door). Accordingly, the door position sensors 190 and 191 may provide one or more signals as to whether the lock (and unlock) signal should be provided.

According to one embodiment, the door position sensors 190 and 191 are structured to determine whether an object is in the opening 170 and 171, respectively. According to another embodiment, the door position sensors 190 and 191 are structured to determine whether an object is placed in any position within the plane of the doors 120 and 122-to-ice merchandiser contact area. For example, a user may place their handle on the panel 130 outside of the opening 170. As the door 120 is put into the first position, the door 120 would squeeze the user's hand between the panel 130 and the door 120. If a door lock signal is provided by the controller 960, the user may experience pain and/or injury. Accordingly, the door position sensor 190 determines that the user's hand is in the contact area of the door-to-panel area, such that the sensor 190 provides a command to the controller 960 to not provide the lock command. After the user removes their hand and no other appendages (or objects) are sensed by the sensor 190, the sensor 190 provides a command to the controller 960 to lock the door 120.

The door position sensors 190 and 191 may be structured as any type of sensor that monitors the contact area of the door-to-ice merchandiser to substantially ensure a user is not impacted by the door. Accordingly, the sensors 190 may include, but are not limited to, hall effect sensors, proximity sensors, capacitive sensors (to determine where the person is touching the ice merchandiser 100), and the like.

According to one embodiment, the door position sensors 190 and 191 may be communicably coupled to the display 151. Accordingly, if an object or appendage is sensed in the contact area, the display 151 may provide an audible and/or visual message of warning (e.g., "An objected is sensed in the closing area. Please remove the object and/or verify that the object is no longer present. Upon confirmation, the locking devices will be actuated."). In turn, users may be alerted if their hand or other appendage is at risk of contact with the door(s) and the ice merchandiser.

The access control system 950 is shown to also include a timer mechanism 952. The timer mechanism 952 may be structured as a relay or any other type of device that controls the duration of the unlock period for the doors 120 and 122. As described more fully in regard to the financial payment system 990, upon access to the cavity 180, the timer mechanism 952 may control how long the door(s) are unlocked to permit access to the cavity 180. Accordingly, after a preset amount of time, the timer mechanism 952 sends a signal to the controller 960 to provide a command to lock the doors of the ice merchandiser. This operation may prevent or substantially prevent uncontrolled access to the ice merchandiser 100 for extended periods of time to prevent theft. In one embodiment, the preset time period may be configurable via the controller 960. For example, in one embodiment, the preset time period may correspond with thirty seconds. In another example, the preset time period may correspond with one-minute. In still other embodiments, the timer mechanism 952 may include an override feature. The override feature is structured to cancel the time duration of the unlock to initiate re-locking.

The override feature and/or timer mechanism 952 in general may be initiated by (1) an operator or attendant of the ice merchandiser 100, which is explained in regard to FIG. 10; by (2) a customer of the ice merchandiser 100; and/or via (3) the interaction of the load cells 992 and financial payment system 990. For example, in regard to number (2) above, after a customer purchases the ice product, the timer mechanism 952 may provide a command via the controller 960 to unlock the door(s) for two-minutes. However, the customer may finish removing the ice product after thirty-seconds. To prevent the ice merchandiser 100 from being accessible for the remaining ninety-seconds, the customer may provide, via the input/output device 150, a confirmation that their transaction is complete. At which point, the timer mechanism 952 is overridden and the controller 960 provides a command to re-engage the locks. In regard to number (3) above, after the purchase is completed, the timer mechanism 952 may provide a command to the controller 960 to unlock the door(s) for the preset period of time. The load cells 992 may then detect a mass change on the platform(s), which indicates that the ice product has been removed. Based upon a comparison between the ice product purchased and the ice product removed (by weight), the controller 960 may determine that all the ice product paid for has been removed. Although there may be time remaining for the unlock position, the controller 960 may provide a command to re-engage the locks on the door(s), which thereby overrides the timer mechanism 952.

In certain embodiments, the functionality of the timer mechanism 952 may be provided to the display 151. For example, a time remaining counter may be shown on the display and/or audibly announced to alert customers of the time remaining for which to complete the ice product removal. If the time remaining is insufficient, a user may be provided with an option via the input/output device 150 to add additional time. To prevent theft, monitoring of the ice product removed may be tracked via the load cells 992. For example, although a customer may have requested additional time, if the controller 960 determines that the product purchased has been removed via the mass determinations from the load cells 992, the controller 960 may provide a message to the customer verifying that the transaction is complete and upon confirmation re-engage the locks.

The access control system is also shown to include an access control device 953. The access control device 953 is structured to lock or unlock the doors 120, 122 to permit access to the cavity 180. The access control device 953 may be included with the ice merchandiser 100 and/or be a remote device relative to the ice merchandiser 100. As shown in FIGS. 1-2, the first door 120 includes a first access device 182 and the second door 122 includes a second access device 184. In this embodiment, the access devices 182 and 184 are structured as key-keyhole devices. In the remote embodiments, the access control device 953 may be structured as a key FOB, as an application on mobile device (e.g., a phone), a computer, a remote, etc. In turn, an attendant or operator of the ice merchandiser 100 may selectively unlock/lock the door(s) to permit/prohibit access to the ice merchandiser, while being physically separate from the ice merchandiser 100. In turn, if the attendant is also operating a nearby convenient store, the attendant need not leave his/her post to open/close the ice merchandiser. This may provide added convenience to operators/attendants of the ice merchandiser.

Figure 10A:
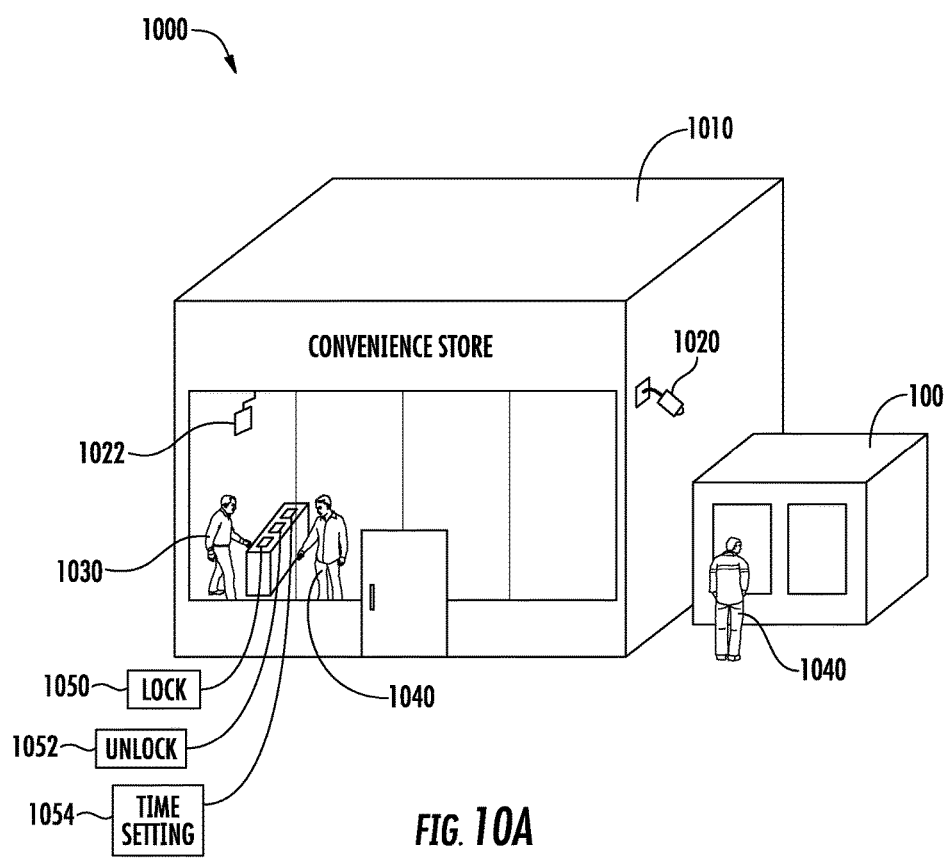

Referring now to FIG. 10A, an example operation of an ice merchandiser 100 with the access control system 950 is shown according to an example embodiment. FIG. 10 depicts a system 1000 embodiment of the ice merchandiser 100. As shown, the ice merchandiser 100 is located outside of a convenient store 1010. An operator 1030 is attending to a customer 1040. In this example, the customer 1040 has chosen to purchase ice product from the ice merchandiser 100. Upon confirmation of the purchase, the operator 1030 actuates the remote control device, shown as the lock 1050 and unlock 1052 mechanisms. The attendant 1030 actuates the unlock 1052 mechanism, which sends a signal to the controller 960 of the ice merchandiser 100 to unlock the locks. Upon pressing the unlock 1052 mechanism, the timer mechanism 952 is initiated (e.g., two minutes). At which point, the customer 1040 has the preset amount of time with which to go to the ice merchandiser 100 and remove purchased ice product.

As mentioned above, an override feature may be included with the timer mechanism 952 that may be initiated by an operator or attendant of the ice merchandiser 100. In the example of FIG. 10A, a video camera 1020 transmits video images of the ice merchandiser 100 to a display 1022 that is viewable by the operator 1030. Here, the operator 1030 may watch the customer take the purchased ice and lock/unlock the ice merchandiser 100 at will. This may ensure that only the purchased product is removed from the ice merchandiser while also not rushing the customer to remove the product.

In FIG. 10B, the access control device 953 is structured as a key FOB 1070, rather than the countertop control devices of FIG. 10A. In FIG. 10B, an interior view (i.e., from the cavity 180) is shown of the ice merchandiser 100. Moreover, the locks 951 are structured as a bar-latch assembly. However, in other embodiments, other locking devices may be utilized. When the unlock button is actuated, the bar moves in a direction 1080 away from the latch to permit access to the cavity 180 via the door 120. When the lock button is depressed, the bar moves in a direction 1082 toward the latch to lock the door.

Figure 11:
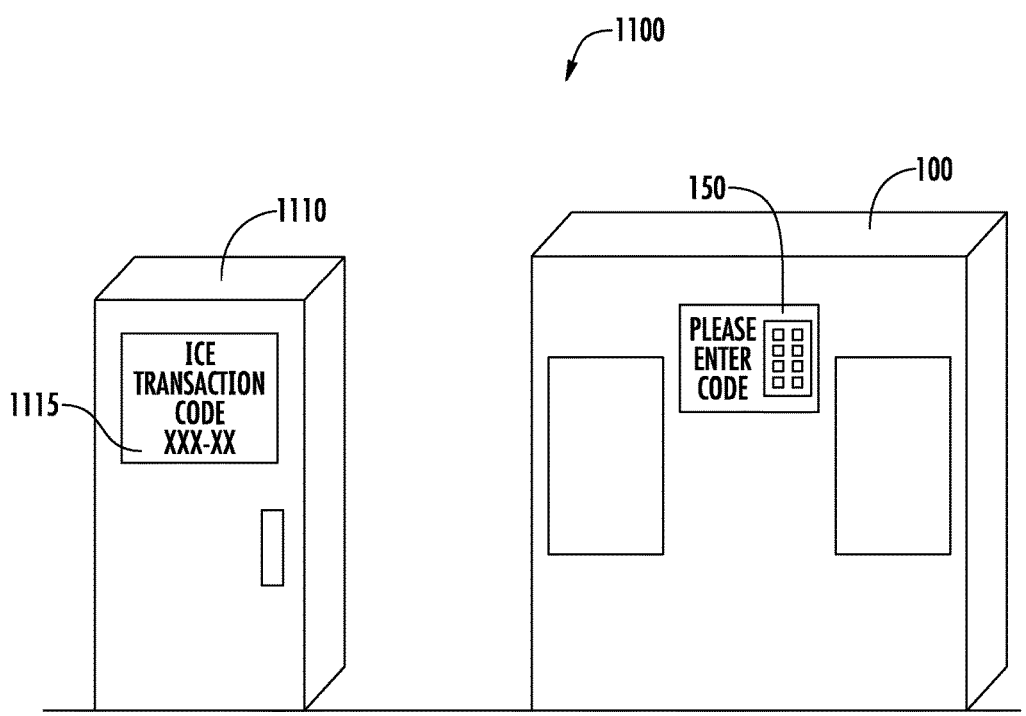
FIG. 11 depicts another system for providing access to an ice merchandiser, according to one embodiment.

In another example embodiment, FIG. 11 shows a remote control access device 953. A system 1100 includes a fuel pump 1110 and an ice merchandiser 100. Here, a user may purchase fuel for their vehicle and simultaneously ice product from the ice merchandiser. Upon purchasing the ice product, a code is provided to the user 1115. The user takes this code to the ice merchandiser 100 and provides it via the input/output device 150. The code is verified by the controller 960. Upon verification, the controller 960 provides a command to unlock one or more of the door(s) of the ice merchandiser. The door(s) will remain unlocked for the duration of the preset time period. Thereafter, the doors may move near the first position (e.g., via the user and/or a biasing member) and actuation of the electromagnetic locks cause the doors to lock shut.

In certain embodiments, a master access device may be used with the access control system 950. The master access device may include, but is not limited, a master code, a master key (e.g., a card with a master barcode, an actual key, etc.), and the like. Use of the master access device may suspend the timer mechanism to permit service personnel to restock the ice merchandiser and/or service the ice merchandiser. Use of the master access device may also be for adjusting one or more settings in the controller 960 (e.g., the cost-per-unit mass of the ice product, the cost for each type of ice product, an unlock position duration, etc.). Accordingly, owners/operators/attendants of the ice merchandiser may use the master access device for a variety of reasons to promote functionality of the ice merchandiser.

Financial Payment System

As shown in FIG. 9, a financial payment system 990 (also referred to herein as the "payment system") is included with the vended model of the ice merchandiser. As mentioned above, the financial payment system 990 is shown to include a card reader 994, load cells 992, and a payment system module 995 among other components. The financial payment system 990 is structured to enable a customer to purchase ice product directly at the ice merchandiser. This provides convenience to the customer, alleviates the need for an attendant or operator to constantly monitor the ice merchandiser, and provides for ice product transactions twenty-four hours a day. Furthermore, the increased amount of access to the ice merchandiser (e.g., not needing the attendant) may result in an enhancement of ice product sales.

An example ice merchandiser 100 with a financial payment system 990 is shown in regard to FIGS. 1-3. Accordingly, explanation of the financial payment system is in regard to FIGS. 1-3 and FIG. 9. To that end, while FIG. 9 shows the payment system module 995 separate from the controller 960, it should be understood that, in certain embodiments, the payment system module 995 may be included with the controller 960. This embodiment is depicted in FIG. 12, which shows a schematic diagram of the controller 960 coupled to various other components of an ice merchandiser according to one embodiment.

Figure 12:
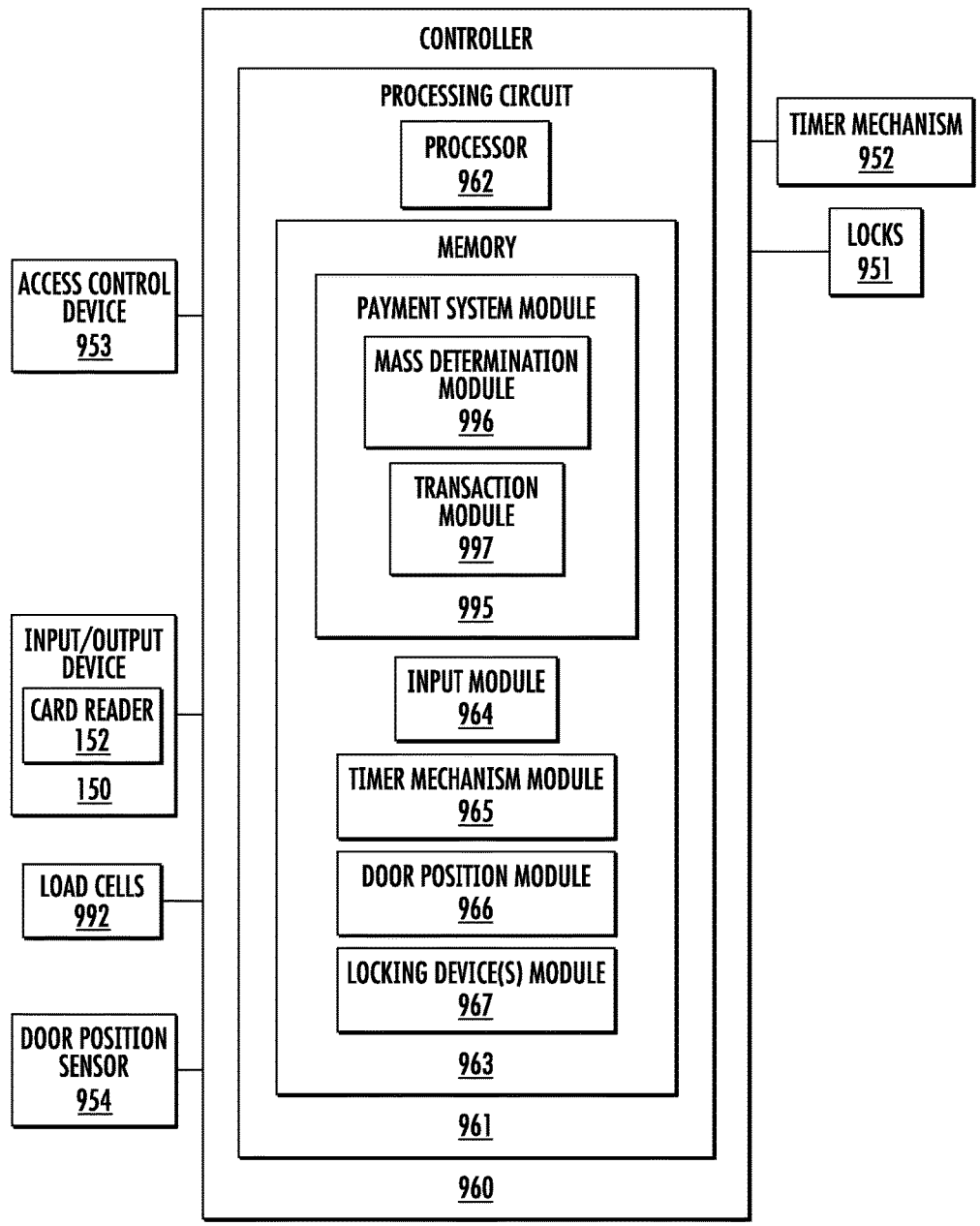
FIG. 12 is a schematic of a controller for an ice merchandiser, according to one embodiment.

As shown in FIG. 12, the controller 960 is communicably coupled to the access control device 953, the input/output device 150, load cells 992, timer mechanism 952, and door position sensor 954. The controller 960 is shown to include a processing circuit 961 including a processor 962 and a memory 963. The processor 962 may be implemented as a general-purpose processor, an application specific integrated circuit (ASIC), one or more field programmable gate arrays (FPGAs), a digital signal processor (DSP), a group of processing components (e.g., one or more processors where the processors are spread out over a range of geographic locations), or other suitable electronic processing components. The one or more memory devices 963 (e.g., NVRAM, RAM, ROM, Flash Memory, hard disk storage, etc.) may store data and/or computer code for facilitating the various processes described herein. Thus, the one or more memory devices 963 may be communicably connected to the processor 962 and provide computer code or instructions to the processor 962 for executing at least some of the processes described in regard to the financial payment system 990 herein. Moreover, the one or more memory devices 963 may be or include tangible, non-transient volatile memory or non-volatile memory. Accordingly, the one or more memory devices 963 may include database components, object code components, script components, or any other type of information structure for supporting the various activities and information structures described herein.

Communication between and among the components of the ice merchandiser 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, commands, and/or data. The CAN bus includes any number and type of wired and wireless connections.

The memory 963 is shown to include various modules for completing at least some of the activities described herein in regard to, for example, the financial payment system 990 and the access control system 950. More particularly, the memory 963 includes modules structured to control access to the ice merchandiser 100 and facilitate payment of the ice product at the ice merchandiser 100. While various modules with particular functionality are shown in FIG. 12, it should be understood that the controller 960 and memory 963 may include any number of modules for completing at least some of the functions described herein. For example, the activities of multiple modules may be combined as a single module; additional modules with additional functionality may be included; etc. Further, it should be understood that the controller 960 may further control other ice merchandiser activity beyond the scope of the present disclosure.

As shown, the controller 960 includes the payment system module 995, which includes a mass determination module 996 and a transaction module 997, an input module 964, a timer mechanism module 965, a door position module 966, and a locking device(s) module 967. As shown in FIG. 12, the controller 960 is coupled to one or more components shown in FIGS. 1-3. Accordingly, as mentioned above, explanation of the controller 960 is in regard to FIGS. 1-3. The input module 964 is communicably coupled to the input/output device 150. The input module 964 is structured to, therefore, receive one or more inputs from a customer and/or an attendant of the ice merchandiser 100. The input module 964 may also provide one or more outputs to the input/output device 150 independent of or in response to an input received. The inputs and outputs may include, but are not limited to, a transaction initiation request, a menu selection (e.g., the display 151 may show instructions on how to use the ice merchandiser, such that a user may select those instructions), an initiation for an ice product transaction, a confirmation that the ice product transaction is complete, an ice product selection, a preset time duration for the timer mechanism 952, a type and cost for each type of ice product (e.g., a three pound bag is $4.00 and a six pound bag is $7.00), a price-per-pound (or other unit of measure) of ice product, verification information (e.g., the security code on the back of a credit card used by the patron, their zip code associated with the payment card, a security question, etc.), and the like.

The timer mechanism module 965 is communicably coupled to the timer mechanism 952. The timer mechanism module 965 is structured to provide one or more commands to the timer mechanism 952 to at least one of initiate, pause, cancel, and/or set/adjust a time duration corresponding to the locks 951 being unlocked and consequently re-locked. The door position module 966 is communicably coupled to the door position sensor(s) 954. The door position module 966 is structured to receive door position data corresponding to at least one of i) whether an object is present in the door-to-ice merchandiser contact area and ii) a position of at least one of the doors. If an object is present, the door position module 966 may provide an override command to the locking devices module 967 to prevent actuation (i.e., locking) of the locks 951. The locking devices module 967 is, therefore, communicably coupled to both the access control device 953 and the locks 951. The locking devices module 967 is structured to provide a command to selectively lock/unlock the locks on the door(s) of the ice merchandiser to permit/restrict access to the cavity.

With the aforementioned description, the payment system module 995 is structured to facilitate at-the-ice merchandiser transactions (e.g., pay for ice product at the ice merchandiser). Accordingly, the payment system module 995 may be communicably coupled to one or more modules described above. As shown, the payment system module 995 includes a mass determination module 996 and a transaction module 997.

The mass determination module 996 is communicably coupled to the load cells 992. Accordingly, the mass determination module 996 is structured to receive weight data from the load cells 992. Based on the weight data, the mass determination module 996 determines a mass of ice product removed from the ice merchandiser 100 during or after an ice product transaction. According to one embodiment, the ice product transaction refers to a bagged ice product transaction. Accordingly, in operation, bagged ice products 300 and 301 are placed on a platform 175 in the ice merchandiser 100 (see FIG. 3). The load cells 992 transmit weight data to the mass determination module 996 to determine a starting weight for at least one of the bagged ice products 300, 301 and/or the ice merchandiser 100 plus the bagged ice products 300, 301. In some embodiments, the unloaded weight of the ice merchandiser may be used to zero or calibrate the mass determination module 996 (e.g., the weight of the ice merchandiser 100 may be 600 pounds, such that 600 pounds is subtracted from the weight determined by the module 996 to determine the weight of the ice product). After the transaction is initiated and a customer begins removing the bagged ice product, the load cells 992 transmit the weight data to the module 996 where the mass determination module 996 determines the change in weight (e.g., in pounds, kilograms, or other unit of measure). Based on the change in weight, the transaction module 997 determines an amount of currency required for the ice transaction based on the determined mass of ice product removed. For example, based on the price-per-pound input received via the input module 964, the transaction module 997 may perform the following determination:

$$\text{Transaction Cost} = \Delta \text{Weight} * (\text{Unit Price}) \quad (1)$$

As an example, twelve pounds of ice product may be determined to be removed from the ice merchandiser and the cost per pound is $1.50. Therefore, the transaction cost is equal to $18.00 (12 pounds*$1.50/pound).

In some embodiments, the mass determination 996 may utilize a filter processor to ensure accuracy in the mass determination (e.g., remove inaccurate weight data). For example, due to gusty winds, the load cells 992 may transmit weight data (after the transaction is initiated) that indicate both an increase and a decrease in weight of ice product. The filter processor may implement a timer that substantially requires the weight data to indicate a relatively constant weight (e.g., each measurement is within five percent of each other) for a preset amount of time (e.g., ten seconds) prior to determining the weight of ice product removed. In this regard, the weight data refers to the measured weight of ice product remaining with the ice merchandiser. In another embodiment, the filter processor may utilize one or more formulas, algorithms, and the like to discard weight data above/below one or more thresholds (e.g., due to gusty winds). In still other embodiments, the mass determination module 996 may provide a determined mass of ice product to the display 151 for the customer to confirm or deny the determined amount of ice product removed. While only three processes are described above, many more processes may be utilized, with all such processes intended to fall within the spirit and scope of the present disclosure.

In some embodiments, the mass determination module 996 may utilize an output message (e.g., alert, notification, etc.) that is provided via the display 151 to account for inconsistent readings, outlier type readings, and the like. For example, if a user is leaning up against the ice merchandiser 100, the load cells may read an incorrect mass. Accordingly, a message may be provided to the display 151 that instructs a user to not lean on the merchandiser. The filter processor, as described above, may be used to determine when a user is leaning on the machine or when a force is acting on the machine that replicates the force applied by a user when leaning against the machine. For example, average wind speeds for the area and time of year may be used as a baseline to determine that forces above that average may replicate a user leaning against the merchandiser. In another example, data may be acquired for a population of people to determine an average force indicative of when people lean against the machine. In this example, forces (e.g., via an accelerometer or any other force detecting sensor) detected above this average or within a predefined range may be used to determine if a user is leaning or otherwise impacting the machine to cause potentially incorrect readings. To facilitate identification of users leaning against or otherwise impacting measurements or readings taken by the load cells, some embodiments of the ice merchandiser may utilize force sensors (e.g., accelerometers) positioned in one or more various positions on or in the ice merchandiser to identify situations indicative of a user impacting the ice merchandiser. For example, an accelerometer may be positioned in or on each door 120, 122 for measuring forces applied to the door. Accordingly, the present disclosure contemplates a wide variety of systems, devices, and methods that may be used to filter out potentially wrong or inconsistent weight data. Moreover, and as described above, in some instances, a message or notification may be provided for instructing the user (or a person in the vicinity) to cease leaning against the merchandiser.

In certain embodiments, the mass determination module 996 is also structured to determine at least one of a bag quantity and type based on the determined mass of ice product removed. For example, the ice merchandiser 100 may hold a first ice product 300 and a second ice product 301 (FIG. 3). Ice product 300 may correspond with a five pound bag of ice and ice product 301 may correspond with a ten pound bag of ice. However, the cost of each bag is not related by a price-per-pound multiplier. For example, the cost of the five pound bag is $4.00 and the cost of the ten pound bag is $7.00 (a discount for buying more ice product). Therefore, in these configurations, the mass determination module 996 also determines a bag quantity and type based on the weight of ice product removed. An example determination algorithm is shown in equation (2), with a transaction cost determination (via transaction module 997) in equation (3) below:

$$\Delta \text{Weight} = A^*(\text{Bag Type I}) + B^*(\text{Bag Type II}) + \quad (2)$$

$$\text{Transaction Cost} = (A)(\text{Cost of Bag Type I}) + (B)(\text{Cost of Bag Type II}) + \quad (3)$$

In equations (2) and (3), the variable "A" represents the number of bags of ice product of type I and the variable "B" represents the number of bags of ice product II. As seen in equations (2) and (3), many more varying types of ice product may be included in the ice merchandiser. In equation (2), the variable "Bag Type I" and "Bag Type II" (and so on) represents the weight of each type of bagged ice product (e.g., bag type I may correspond with a five pound bag and bag type II may correspond with a ten pound bag). In equation (2), the variable $\Delta$Weight is a measured and/or estimated quantity from the load cells 992. Therefore, via one or more numerical methods, the mass determination module 996 may determine the number of bags of each ice product, which is then used in equation (3) that accounts for varying costs of each ice product (i.e., the variables "Cost of Bag Type I" and "Cost of Bag Type II").

Based on the determinations of the mass determination module 996, the transaction module 997 is structured to determine a transaction cost (e.g., an amount of currency) for the ice product transaction. Example ice product transaction costs are shown in regard to equations (1) and (3) herein, where the transaction module 997 determines a cost of the transaction based solely on the determined amount of ice product removed (equation (1)) and determines a cost of the transaction based on a determined quantity and type of ice product purchased (equation (3)). In some embodiments, upon completion of the ice product transaction, the payment system 990 may provide or ask the patron whether they desire a receipt that details the ice product transaction (e.g., what was purchased and the cost of the purchase).

While the transaction module 997 is described primarily herein in determining a transaction cost based on the mass and/or weight of the ice product removed. It should be understood that in other embodiments, the transaction module 997 may utilize other characteristics to determine a transaction cost. For example, in regard to the self-elevating platform embodiments described herein, the transaction cost may be based solely or at least in part on a position or a change in position of the platform. In this regard, the transaction module 997 may receive platform position data indicative of a position of the platform. Elevations of the platform may correspond with various costs. For example, a one-inch raise in platform height relative to a starting height corresponds with a $12 charge and a 1.5 inch raise corresponds with an $18 charge. Of course, the gradations or delineations of charge need not follow a linear scale (e.g., there may be a price discount for larger quantities) and are highly configurable. Alternatively, the elevations may correspond with a mass removed, which may be converted into a transaction cost as described herein.

In another example, where the platform is static (i.e., not self-elevating), the ice merchandiser 100 may include one or more sensors positioned within the cavity that monitor the position of ice product. For example, sensors may establish a starting height of the product relative to the platform and after the user removes the product, the sensor may acquire data indicative of the new height of the product on the platform. Or, the sensor may determine an initial topography (e.g., via a photograph). After the product is removed, the sensor may acquire data or determine a post-ice product removal topography. In each instance, a transaction cost may be determined based on the new height and/or new topography. For example, each reduction in height may correspond with a cost in a similar fashion to the elevation height for the self-elevating platform. Or, in regard to the topography instance, a determination may be made regarding the type and quantity of ice product removed to generate the transaction.

Accordingly, as those of ordinary skill in the art will recognize, the transaction module 997 may use many characteristics of an ice product transaction to determine or generate a transaction cost such that a weight difference (as primarily described herein) should be interpreted as only one method in a plurality of methods, with all such methods intended to fall within the spirit and scope of the present disclosure.

The transaction module 997 is also structured to determine the start of and completion of the ice product transaction. As used herein, the phrase "ice product transaction" refers to the duration of beginning and ending an ice product purchase. Analogously, the phrase "bagged ice product transaction" refers to the duration of beginning and ending a bagged ice product purchase (e.g., to purchase bagged ice 300). The transaction module 997 may determine that an ice product transaction has begun via at least one of a payment card reception (e.g., a credit card swipe via card reader 152), an input received via the input/output device 150 (e.g., a patron may push a button that says "Press Here to Begin Ice Product Purchase"), and by actuation of an access control device 953 (e.g., a user may press an unlock button on the key FOB of FIG. 10, a payment code may be received via the input/output device 150 as in FIG. 11, etc.). The transaction module 997 may determine that the ice product transaction is complete via an input via the input/output device 150 (e.g., a customer may indicate their purchase is complete), a relatively constant mass (e.g., each measurement is within five percent of each other) for ice product remaining in the ice merchandiser for a preset amount of time (e.g., thirty seconds), the door position sensor indicating that the door(s) or locked or have been at or near the first (close) position for a preset amount of time, and/or expiration of the unlock time duration.

Figure 13:
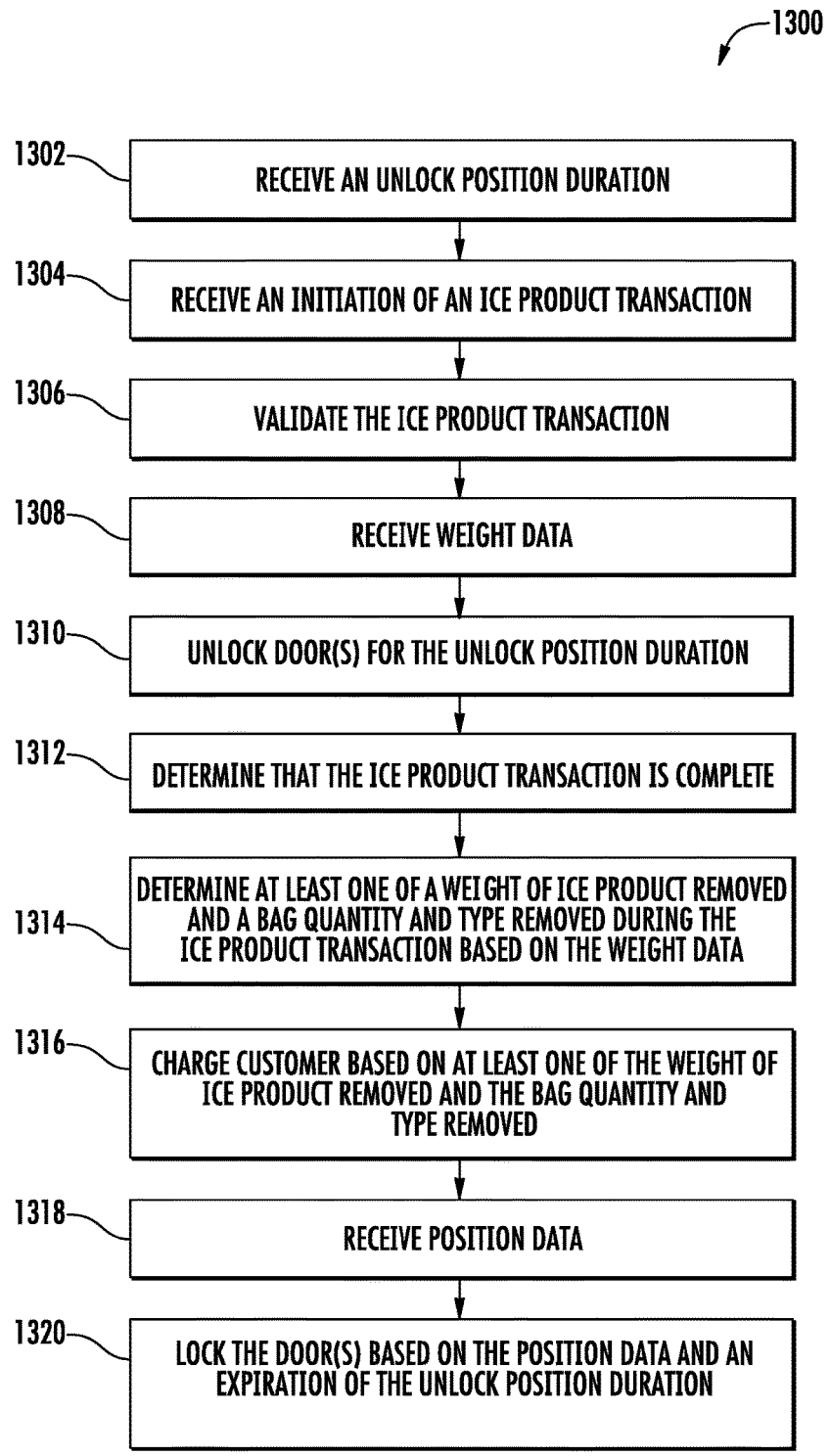
FIG. 13 is a flowchart of a method of operating a financial payment system included with an ice merchandiser, according to one embodiment.

Referring now to FIG. 13, a flow chart of a method 1300 of operation of a financial payment system with an ice merchandiser is shown according to one embodiment. Method 1300 may be implemented with the ice merchandiser of FIGS. 1-3 and the controller of FIGS. 9 and 12. Accordingly, explanation of method 1300 may be in regard to those Figures.

At step 1302, an unlock position duration is received. For example, an operator or attendant of the ice merchandiser 100 may provide, via the input/output device 150, an unlock position duration (e.g., two minutes) which is communicated to the timer mechanism module 965. At step 1304, an initiation of an ice product transaction is received. According to one embodiment, the payment system 990 of the ice merchandiser 100 is structured to only utilize payment cards (e.g., credit, reward, and/or debit cards). Accordingly, transaction initiation may begin by a customer utilizing the card reader 152 and swiping their payment card. In various alternate embodiments, the financial payment system 990 may accept any type of currency (e.g., cash). In some embodiments, the user may provide an input indicating their desire to initiate an ice product transaction. The display 151 may depicts the various ice products housed by the ice merchandiser 100 and their associated costs. The customer may select the ice products they want to purchase and then provide payment (e.g., payment card, cash, etc.). After validation of the payment (step 1306), initial weight data is received (step 1308). By making an initial determination subsequent to validation, the frequency of weight determinations may be reduced to only or substantially only be in response to valid transactions. Upon receiving the weight data or simultaneously, the doors are unlocked for the unlock position duration (step 1310).

In the embodiment where the transaction is initiated via a card swipe, at step 1306, the transaction is validated. At this step, one or more processes may validate the payment card (e.g., authenticity, sufficient funds, etc.). For example, a user may be asked to input their zip code via the input/output device 150 and/or types of identifying information. This may be performed by one or more processors utilizing additional payment procedures. Upon validation, an initial weight determination is generated (step 1308). Subsequently, the doors are unlocked for the unlock position duration (step 1310). At this point, the customer may remove the desired ice product (e.g., type and quantity thereof).

At step 1312, a determination is made that the ice product transaction is complete. Determination of when the ice product transaction is complete may be via similar processes to that described above in regard to the transaction module 997. For example, in one embodiment, a customer may provide an affirmative indication (e.g., via input/output device 150) that he/she is done removing the ice product. In another example, if the unlock position duration is near expiration, the controller 960 may provide an audible and/or visual message via the display 151 asking the customer if he/she needs more time. If the customer affirmatively responds, a preset additional amount of time may be added to the unlock position duration. If the customer declines or does not respond, the controller 960 may determine that the transaction is complete. In another embodiment, the determination may be made via weight data using, for example, the mass determination module 996. For example, relatively constant weight data (corresponding to the mass of ice product remaining in the ice merchandiser) for a preset amount of time may be used to indicate that the transaction is complete (e.g., the customer is not removing or putting back any ice product). In still another embodiment, the determination may be made based on the door(s) being moved to at or near the close position (as determined by the position data received at step 1318). The transaction complete determination may be made if the door(s) are in the close or near close position for a preset amount of time (e.g., ten seconds of non-movement).

At step 1314, based on the weight data, at least one of a weight ice product removed and a bag quantity and type removed is determined (step 1312). This determination may be provided to the input/output device 150 for the user to confirm/deny the determination. According to one embodiment, while the ice product is removed, weight data is continuously received, such that weight changes may be monitored and tracked. According to another embodiment, weight data is received after the transaction is complete, where this subsequent weight data is used to determine a change in weight from the beginning to the end of the ice product transaction. Beneficially, taking an initial reading and a reading after the transaction is determined to be complete, the use of varying and potentially incorrect weight data may be avoided. Such a process may improve efficiency and of the weight change determination. As mentioned above, in certain embodiments, ice products may be priced per unit weight. In other embodiments, differing weights correspond with different costs where the price-per-unit weight is not constant. Depending on how an operator/attendant sets up the financial payment system 990 of the ice merchandiser 100, the determination at step 1314 may vary.

After a determination that the transaction is complete and based on at least one of the weight of ice product removed and the bag quantity and type removed, the customer is charged (step 1316). In this configuration, the customer has not had to preselect the ice products to be purchased. Accordingly, this embodiment enables the customer to change his/her mind when making the purchase. For example, a customer may initially remove a bagged ice product and then return it to the ice merchandiser after determining that he/she no longer wants/needs that ice product. However, in other embodiments, the customer may be required to provide an indication of the quantity and type of product desired before the doors are unlocked. Such an indication may be used by the controller 960 to provide an initial guess or estimate of the ice product to be removed, which may streamline the determination after the transaction is determined complete. Upon verification of payment, the doors may be unlocked. If the customer decides to purchase a quantity and/or type of ice product that differs from the indication previously provided, one or more of the following mechanisms may be used. In one instance, the customer may provide this change via the input/output device, where the providing of this change may be prompted (e.g., the mass determination module 996 may determine that the customer has removed an amount of ice product different from his/her initial designation) or unprompted (e.g., the user wants to re-adjust his/her purchase). In another instance, the mass determination module 996 may determine the type and quantity of ice product removed and cross-reference this determination with the customer's initial designation. If there is a discrepancy, the controller 960 may provide an alert to the input/output device asking for clarification from the customer. Or, the controller 960 may only charge the customer for the ice product determined to be removed to avoid any type of overcharging. In still another instance, any combination of determinations and customer inputs may be used to facilitate and confirm the transaction.

At step 1318, position data is received. The position data corresponds to a position of the door(s) of the ice merchandiser 100. The position data may also correspond with an indication of whether an object is within the door(s)-to-ice merchandiser contact area (e.g., via door position sensor 954). If the position data indicates that the door(s) is in a lockable position (e.g., the locks could be actuated to lock the door to the ice merchandiser) and that there are no objects in the contact area, the door(s) of the ice merchandiser 100 are locked (step 1320). Basing the lock actuation command on the presence of objects in the door-to-ice merchandiser contact area substantially ensures that pinching of a user's appendages is substantially prevented.

If the transaction is complete and the position data indicates that no object is present in the contact area, but that the door(s) is in the full open position, the controller 960 may provide a notification to an attendant of the ice merchandiser 100 to shut the door(s). For example, the controller 960 may provide a text message, an email message, an alert to a monitoring system for the ice merchandiser, etc. to the attendant. In another embodiment, as mentioned above, the ice merchandiser 100 may include one or more biasing members (e.g., one or more springs, actuation members such as a hydraulic cylinder, an off-centered weight, etc.) that bias the door(s) towards the close position. In this regard, the biasing members may be structured to move the door(s) into a lockable position. In still another embodiment, the controller 960 may provide a notification to the display 151 to instruct a user or other passerby to please shut the door(s). All such variations are intended to fall within the spirit and scope of the present disclosure.

While method 1300 uses the weight data in regard to a purchase price determination (i.e., the transaction cost), the weight data may also be provided to a remote monitoring unit of the ice merchandiser 100. For example, via a network (e.g., Internet), the weight data is transmitted to a computer within a convenience store (in other embodiments, an application on an attendant's phone or tablet computer). If the weight data indicates that the weight of ice product is below a preset threshold, convenience store personnel may be alerted that restocking of the ice merchandiser is needed. The preset threshold may vary based on the type of ice merchandiser and the desire of the store personnel (e.g., one operator may wish to always keep the ice merchandiser relatively more stocked than another operator). This operation may provide additional convenience to the store clerk personnel, such that they need not constantly monitor the ice merchandiser for when it needs to be restocked.

An example operation of method 1300 may be described as follows. A user approaches the ice merchandiser and swipes their credit card to purchase ice. Their card is validated using one or more pieces of identifying information (e.g., their zip code) and the door (or doors if a multiple door unit ice merchandiser) is unlocked. The user opens the door and begins removing ice product. The controller 960 receives weight data that indicates that no weight change has occurred for a preset amount of time and that the user has removed X pounds of ice product. The controller 960 determines that the ice product transaction is complete (based on the no weight change for the preset amount of time) and charges the customer for the amount of ice product removed (e.g., can be on a per unit weight cost or a type and quantity of ice product cost, as described above). The controller 960 then determines that no object is in the door(s)-to-ice merchandiser contact area and that the door(s) are in a lockable position, such that the controller 960 provides a command to lock the door(s). The weight of the ice product stored in the ice merchandiser 100 based on the weight of ice product removed is maintained (e.g., in memory 963) for the next ice product transaction. In this regard, the ice merchandiser 100 is a self-service ice merchandiser that can be operated substantially without attendant supervision.

Figure 14:
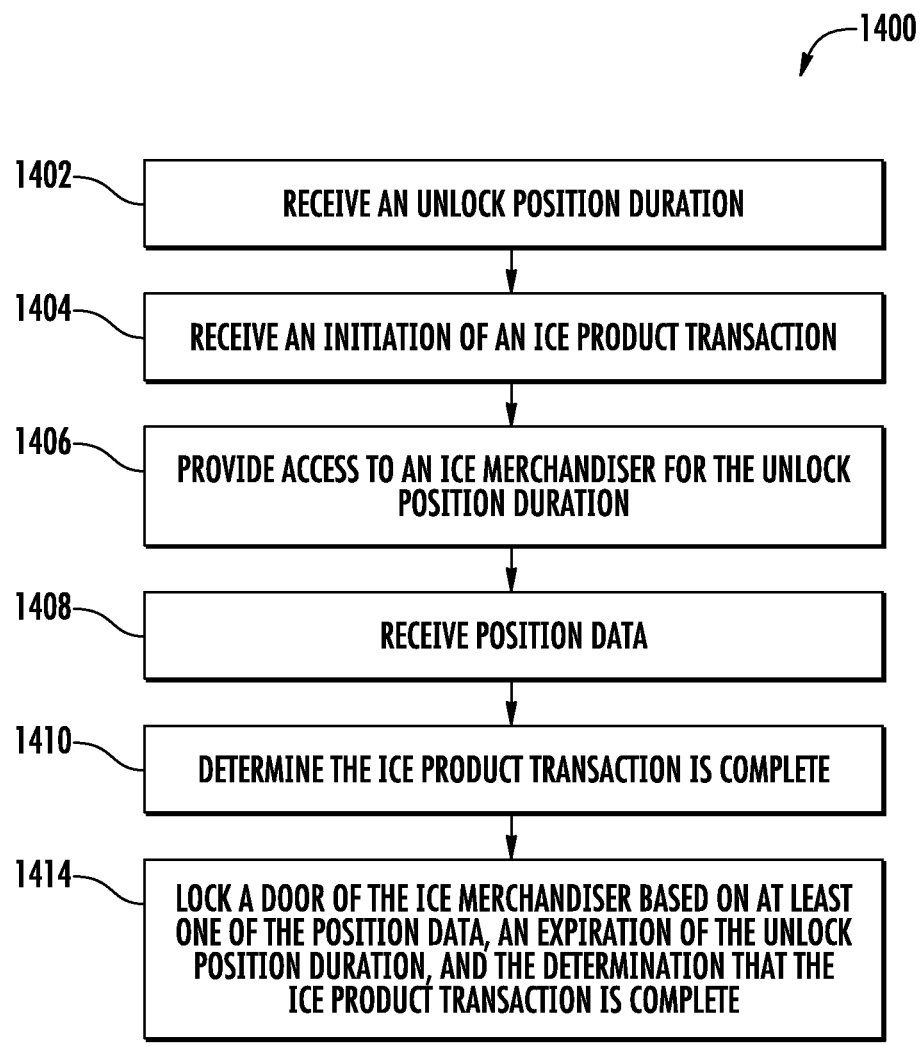
FIG. 14 is a flowchart of a method of operating an ice merchandiser with an access control system and a financial payment system, according to another embodiment.

Referring now to FIG. 14, a method 1400 of operating an ice merchandiser with the access control system and the financial payment is shown according to another embodiment. While FIG. 13 relates to ice product transactions directly at the ice merchandiser, the method 1400 relates to ice product transactions away from the ice merchandiser (e.g., within a convenient store with the ice merchandiser located outside). Example graphical depictions of such situations are shown in regard to FIGS. 10A-11.

At step 1402, an unlock position duration is received. This step is analogous to step 1302 of method 1300. At step 1404, an initiation of an ice product transaction is received. In one configuration, the ice product is purchased away from the ice merchandiser. For example, FIG. 10A depicts a customer purchasing ice product from a convenient store. In FIG. 11, a customer purchases ice product from a fuel pump. In another configuration, the initiation may be at the ice merchandiser via, for example, a patron swiping their payment card at the card reader 152. At step 1406, access to the ice merchandiser is provided for the unlock position duration. According to one embodiment, access may be provided via an access control device, such as access control device 953. For example, in FIGS. 10A-10B, an attendant of the ice merchandiser may use a remote control to unlock the door(s) of the ice merchandiser after the ice product has been purchased. The attendant may utilize a video monitoring system to watch the customer and determine when the transaction is complete. In another embodiment, the ice merchandiser stays unlocked for the unlock duration such that the attendant needs to only provide the unlock actuation command. In other embodiments, the customer may be provided the remote access device. For example, in FIG. 11, the customer may be provided with a code to be entered on the ice merchandiser 100. After the code is accepted, the door(s) are unlocked for the unlock position duration. The code may be provided on a separate ticket, as part of a receipt, as an email code to be scanned by a scanner on the ice merchandiser, etc. Thus, access may be provided via an attendant or the user providing an access key (e.g., a code) at the ice merchandiser.

At step 1408, position data is received. This step is analogous to step 1318. At step 1410, a determination that the ice product transaction is complete. The transaction refers to the customer being done with the removal of purchased ice product. The determination may be based on the same ways as described above in regard to step 1314. At step 1414, a door of the ice merchandiser is locked based on at least one of the position data, an expiration of the unlock position duration, and the determination that the transaction is complete.

Clean & Clear Ice Merchandiser

As mentioned above, according to one embodiment, the ice merchandiser of the present disclosure may include one or more "clean and clear" features. A "clean" feature refers to a feature that is structured to at least partly kill and/or inhibit growth of harmful microorganisms that may cause sickness. A "clear" feature refers to a feature that is structured to maintain a relatively high visibility with a window of the ice merchandiser. FIGS. 15-22 depict clean and clear features for an ice merchandiser of the present disclosure.

FIGS. 15-18 are largely analogous to FIGS. 1-4A herein. Accordingly, similar features may be shown but not described in this section. However, unless otherwise indicated, similar annotated features have similar structure and function as previously described.

Figure 15:
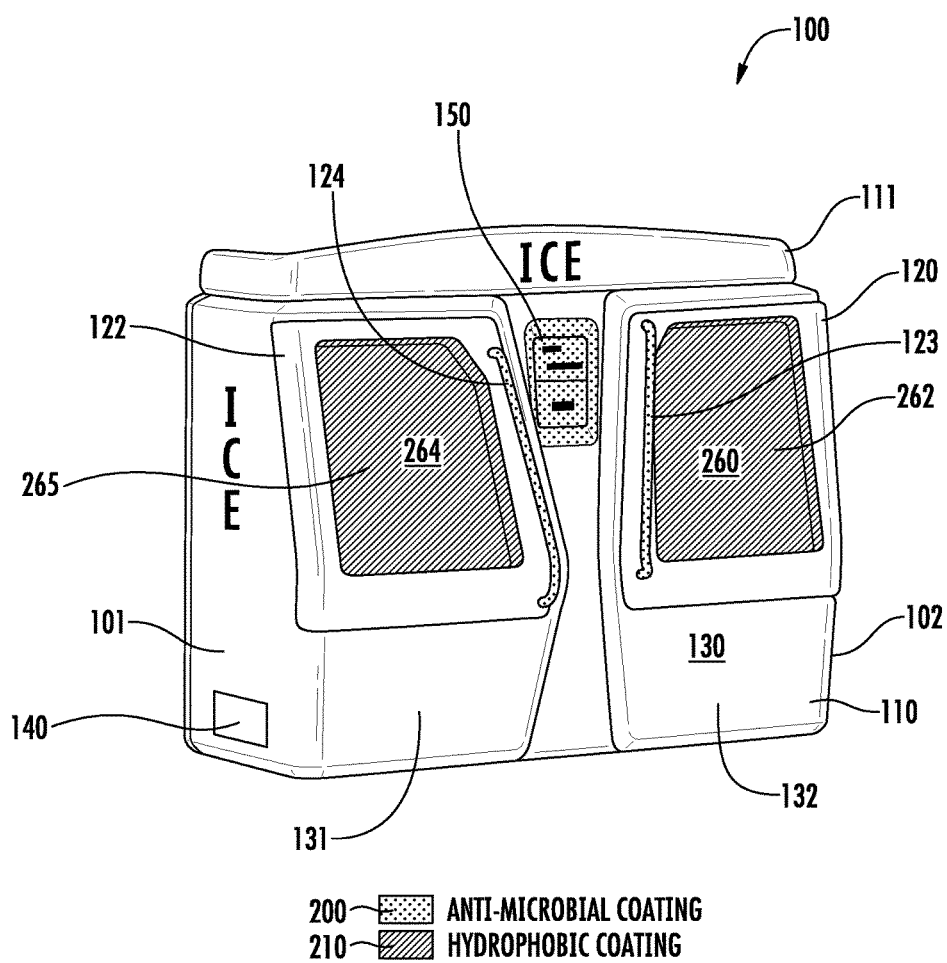
FIG. 15 is a two-door ice merchandiser that includes anti-microbial and hydrophobic coatings with both doors in the full close position, according to one embodiment
Figure 16:
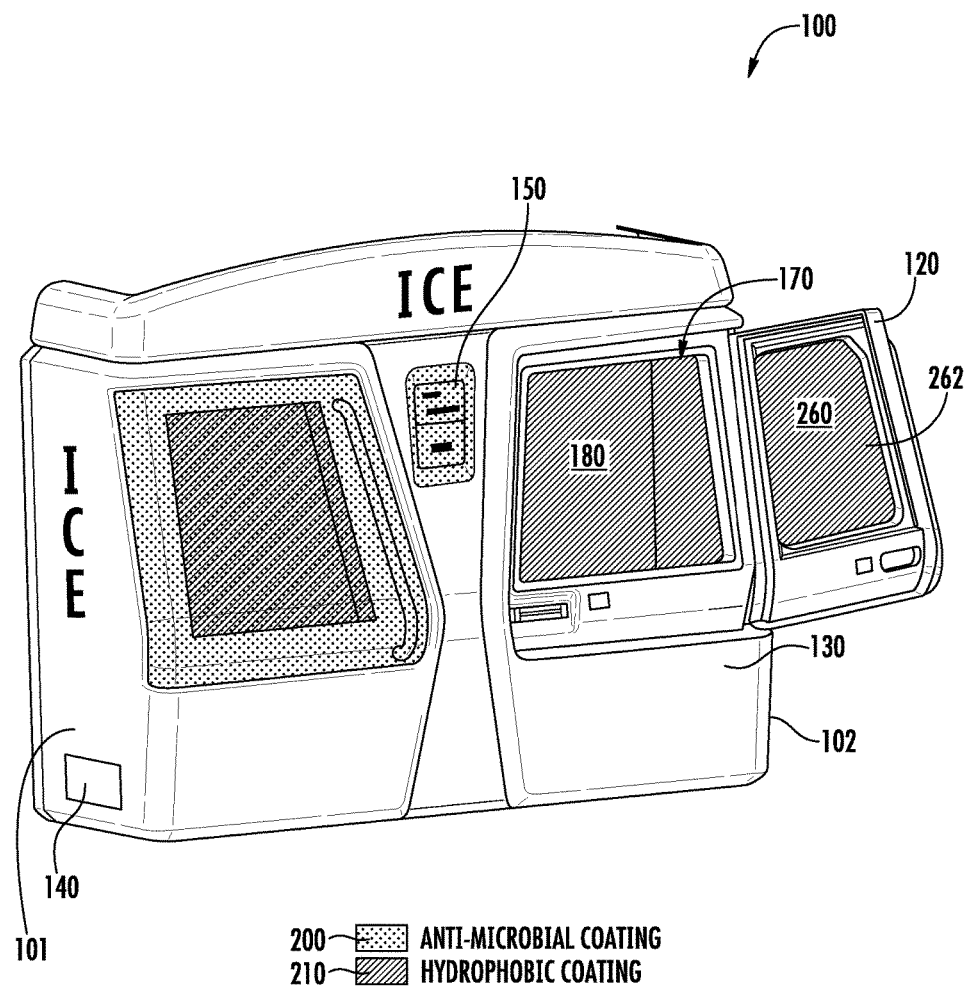
FIG. 16 is a two-door ice merchandiser that includes anti-microbial and hydrophobic coatings with one door in the full close position and the other door in the full open position, according to one embodiment.
Figure 17:
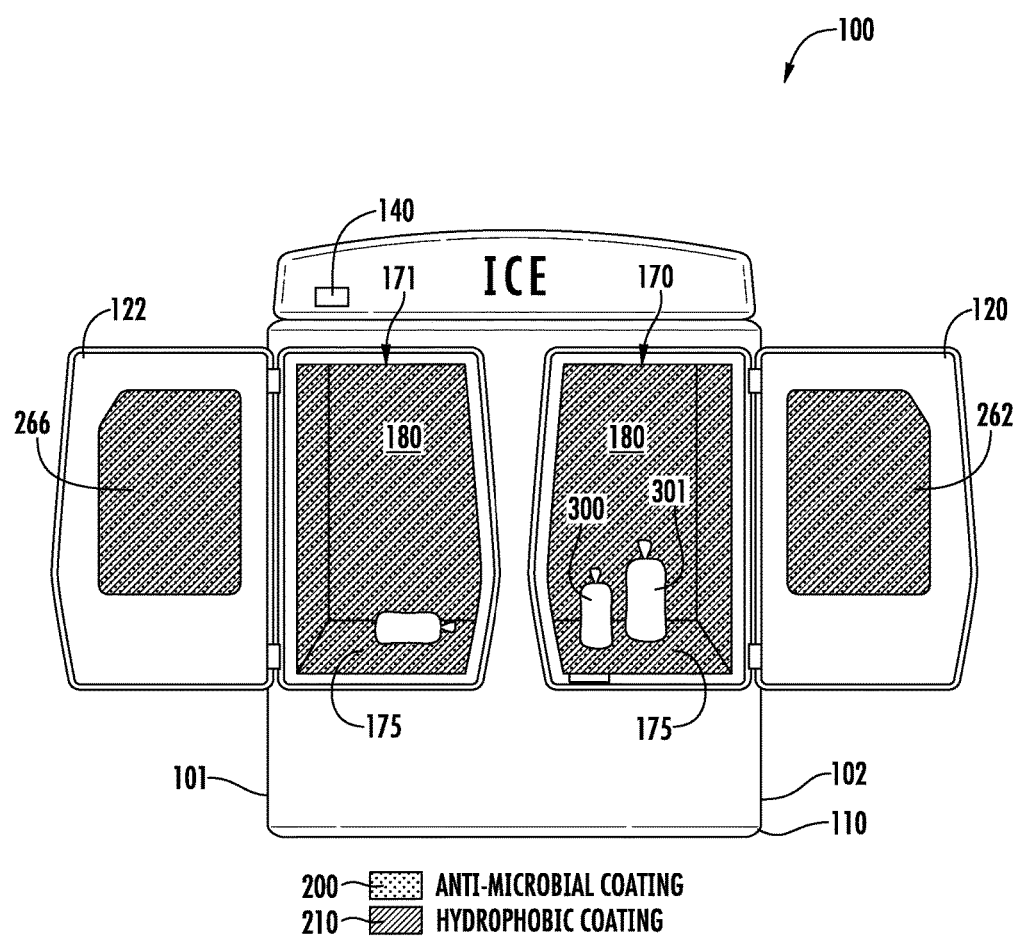
FIG. 17 is a two-door ice merchandiser with anti-microbial and hydrophobic coatings with both doors in the full open position, according to one embodiment.

As shown in FIGS. 15-17, the first door 120 includes a window 260. The window 260 includes an exterior surface 261 and an interior surface 262. When the first door 120 is in the full close position, the interior surface 262 is located substantially in the cavity 180 of the ice merchandiser 100. Thus, in the first position, the interior surface 262 is proximate the opening 170 and in the second position, the interior surface 262 is spaced apart from the opening 170. Similar to the first door 120 configuration, the second door 122 is shown to include a window 264. The window 264 includes an exterior surface 265 and an interior surface 266. When the second door 122 is in the first position, the interior surface 266 is proximate the opening 171. In other words, when the second door 122 is in the full close position, the interior surface 266 is substantially located in the cavity 180.

The windows 260, 264 are structured to be substantially transparent to permit a patron to view the ice product stored in the cavity 180 of the ice merchandiser 100. Accordingly, the windows 260, 264 may be constructed like any other type of window (e.g., insulated, single pane, double pane, etc.) and with any material (e.g., glass) used to make windows.

While the ice merchandiser 100 only depicts windows 260, 264 located on the first and second doors 120, 122, it should be understood that in some embodiments, only one window may be utilized in the two-door ice merchandiser embodiment. In other embodiments, the ice merchandiser may include zero windows. In still other embodiments, the one or more windows may be located in places other than (or in addition to) the doors. For example, windows may be placed on the left side 101 and/or right side 102 of the ice merchandiser 100 to permit passersby to peer into the cavity 180 from other angles in addition to an orthogonal viewpoint relative to the doors 120, 122. All such variations of window configurations for an ice merchandiser are intended to fall within the spirit and scope of the present disclosure.

As shown in the FIGS. 15-17, the ice merchandiser 100 includes an anti-microbial coating 200. The anti-microbial coating 200 is configured to kill, prevent, and/or inhibit growth of at least one of a stain-causing and an odor-causing bacteria, mold, mildew, fungus, and other potentially infectious or harmful microorganisms that may cause sickness. According to one embodiment, the anti-microbial coating 200 is structured as a chemical-type anti-microbial coating. For example, the anti-microbial coating 200 may include, but is not limited to, an antibacterial coating, an antifungal coating, an antiviral coating, an antiparasitic coating, a disinfectant, an antibiotic, and the like. These, and other types, of anti-microbial coatings may be applied individually and/or collectively to one or more surfaces of the ice merchandiser 100. Furthermore, the type of anti-microbial coating may differ based on which surface the coating is applied to on the ice merchandiser 100 (e.g. an antiviral coating is provided on the handles while an antifungal coating is applied to surfaces in the cavity 180). All such variations are intended to fall within the spirit and scope of the present disclosure.

According to one embodiment, the anti-microbial coating 200 is epoxy-based. As a result, the anti-microbial coating 200 is configured to be substantially wear and scratch resistant. In other embodiments, the anti-microbial coating 200 may include any other feature (e.g., resin-based) that substantially prevents the need for re-application of the coating due to it being wear, weather, and scratch resistant. Accordingly, the anti-microbial coating 200 may be structured to substantially resist decomposition due to the sub-freezing temperatures in the cavity 180. In other embodiments, the anti-microbial coating 200 does not include any type of wear or weather resistant features, such that coating may need to be periodically re-applied to desired areas of the ice merchandiser 100. All such variations are intended to fall within the spirit and scope of the present disclosure.

According to one embodiment, the anti-microbial coating 200 is provided on high contact areas of the ice merchandiser 100. Accordingly, as shown, the anti-microbial coating 200 may be applied to the first door 120, handle 123, window 260 (e.g., exterior surface 261), second door 122, handle 124, window 264 (e.g., exterior surface 265), input/output device 150, and panel 130. According to another embodiment, the anti-microbial coating 200 may also be applied to one or more surfaces that may be within the cavity 180. For example, the anti-microbial coating 200 may be applied to the interior surface 262 of the window 260, the interior surface 266 of the window 266, one or more interior surfaces of the housing 110 that define the cavity 180, platform 175, and the like. In this regard, as bagged ice product is transferred into and out of the ice merchandiser 100, the bagged ice product is substantially prevented from acquiring harmful bacteria. As a result, by providing the anti-microbial coating 200 to both of the patron high-contact areas and the bagged ice product contact areas, bacteria and other harmful microbes are substantially prevented from spreading, growing, and being transmitted from either a user's interaction with the bagged ice product or their interaction with the ice merchandiser 100. According to still another embodiment, the anti-microbial coating 200 may be applied to the internal ductwork used with the ice merchandiser. For example, ducts may be used to remove heat from the cavity to cool the cavity. These ducts may include an anti-microbial coating 200 that inhibits, removes, kills, etc. growth within the ducts. Beneficially, harmful microorganisms that could be transported or migrate via the ducts into a patron contact area (e.g., within the cavity, on the ice product, etc.) are killed or removed to prevent such transmission or migration.

While the anti-microbial coating 200 is shown to be generally applied to various surfaces, as described above, it should be understood that the anti-microbial coating 200 may be applied to only portions of each surface (e.g., a middle portion of the handle 124), applied thicker in some spots over others (e.g., relatively higher contact areas, such as the input/output device 150 may be coated thicker than the exterior surface 265 of the window 264), and/or applied with other coatings (e.g., an anti-frost (hydrophobic) coating). Furthermore, while the anti-microbial coating 200 is described herein as a "coating," in some embodiments, anti-microbial additives may be infused in the material (e.g., polymer) used to manufacture the ice merchandiser. All such variations are intended to fall within the spirit and scope of the present disclosure.

Referring now to FIG. 18, a cross-sectional side view of the ice merchandiser 100 with anti-microbial and hydrophobic coatings is shown, according to one embodiment. As shown, the housing 110 includes an interior back surface 103, an interior front surface 104, an interior bottom surface 105, and an interior surface 106. Surfaces 103-106 and the interior surface of the door 120 (including interior surface 262 of window 260), among other features not shown due to the cross-section, define the cavity 180. As mentioned above, the platform 175 is located within the cavity 180 and is structured to support the bagged ice product 300 (as shown in FIG. 18).

As shown in FIG. 18, the ice merchandiser 100 includes a hydrophobic coating 210 applied to various surfaces in the cavity 180. The hydrophobic coating 210 is any type of surface coating that repels water, which substantially prevents the formation of frost or ice. As a result, the surfaces that define the cavity 180 may remain substantially free from condensation, which may provide for a clean and clear appearance. Furthermore, by substantially preventing the formation of frost or ice, not only do the windows remain clear to permit passersby to peer through the window, but the cavity 180 volume is likely to be occupied by a relatively lesser amount of frost and ice. As a result, the ice merchandiser 100 may be able to store a relatively greater amount of bagged ice product.

The hydrophobic coating 210 may include any type of hydrophobic or anti-frost coating. According to one embodiment, the hydrophobic coating 210 is wear and scratch resistant to substantially prevent the need to continuously apply the coating to one or more of the surfaces. According to another embodiment, the hydrophobic coating 210 is weather resistant, such that it is able to withstand below freezing temperatures (e.g., at or below thirty-two degrees Fahrenheit). In turn, the hydrophobic coating 210 may still function properly within the cavity 180. According to one embodiment, the hydrophobic coating 210 is a superhydrophobic coating. As such, the thickness of the coating is on a nanometer scale, which may prevent substantial space from being occupied in the cavity 180 by the coating 210. In some embodiments, the hydrophobic coating 210 may also be oleophobic, thereby able to repel most hydrocarbons. As a result, dirt, grime, and mold may also be repelled by the hydrophobic coating 210.

As shown in FIG. 18, the hydrophobic coating 210 is applied to one or more surfaces within the cavity 180. These surfaces includes surfaces 103-106, platform 175, and the interior surface 262 of the window 260. In one embodiment, the hydrophobic coating 210 is provided on every surface in the cavity 180. In other embodiments, the hydrophobic coating 210 may be selectively provided on some, but not all, of the surfaces within the cavity 180 (e.g., interior bottom surface 105 and not the interior top surface 106). In certain embodiments, application of the hydrophobic coating 210 may be thicker in some spots over others, applied on only some portions of a surface (not the entire surface), and/or applied with other coatings (e.g., the anti-microbial coating 200). According to an alternate embodiment, the hydrophobic coating 210 may also be provided on one or more exterior surfaces (relative to the cavity 180) of the ice merchandiser 100. For example, the hydrophobic coating 210 may be applied to the exterior surfaces 261, 265 of the windows 260, 264 to substantially prevent frost or condensation (e.g., from the temperature differential between the outside environment and that within the cavity 180) from accumulating on the outside of the window. All such variations are intended to fall within the spirit and scope of the present disclosure.

The ice merchandiser 100 is also shown to include an ultraviolet (UV) lamp 220. The UV lamp 220 is configured to emit a UV beam within the cavity 180. Similar to the anti-microbial coating 200, the UV beam is configured to inhibit growth and/or kill harmful germs, microbes, fungus, mold, and the like that may otherwise grow within the cavity 180 (including on the bags of the bagged ice 300 and within the bags of the bagged ice 300 (i.e., the UV beam is configured to penetrate the bags into the ice product)). As such, in one embodiment, the UV lamp 220 is structured as an ultraviolet germicidal irradiation lamp configured to emit a germicidal ultraviolet beam. Germicidal UV beams are short range UV (UVC) beams that have a relatively short wavelength (e.g., approximately 280-100 nanometers). Due to the relatively short wavelength, these UVC beams are harmful to microorganisms. As a result, the UV lamp 220 may provide an additional layer of sterilization (e.g., relative to an anti-microbial coating 200) to the ice merchandiser 100 to ensure a substantial reduction in the spreading of germs, microbes, and other harmful bacteria from patrons using the ice merchandiser 100.

FIG. 19 depicts a close-up view of the door 120 for the ice merchandiser 100 as shown in FIG. 18, according to one embodiment. In this configuration, the window 260 includes a hydrophobic coating 210 on its interior surface 262 and an anti-microbial coating 200 on its exterior surface 261. In other embodiments, the anti-microbial coating 200 may also be provided on the interior surface 262 and the hydrophobic coating 210 may also be provided on the exterior surface 261. As such, FIG. 19 shows only one example embodiment of the ice merchandiser with an anti-microbial coating 200 and a hydrophobic coating 210. All other variations are intended to fall within the spirit and scope of the present disclosure.

Referring now to FIG. 20, the ice merchandiser 100 may also include a thin film 230 applied to the surfaces of the windows 260, 264 (i.e., interior surfaces 261, 265 and exterior surfaces 262, 266). In one embodiment, the thin film 230 is structured as an optically clear or substantially clear polymer film. The polymer film mostly prevents condensation of water from forming on the surfaces of the window. As a result, patrons may notice a relatively cleaner, clearer window and have an unobstructed view of the bagged ice product. In some embodiments, the thin film 230 is only applied to an interior or an exterior surface of a window. In other embodiments, the thin film 230 is only applied to both surfaces of one window (rather than every window on the ice merchandiser). All such variations are intended to fall within the spirit and scope of the present disclosure.

Referring to FIG. 21, a bagged ice product 300 for an ice merchandiser 100 is shown, according to one embodiment. The bagged ice product 300 includes a bag 310 for holding the ice 320. In one embodiment, at least one of the anti-microbial coating 200 and the hydrophobic coating 210 are provided on the bag 310 (e.g., at least one of an interior surface proximate the ice 320 or an exterior surface of the bag 310 proximate the environment). The anti-microbial coating 200 and hydrophobic coating 320 may have the same structure and function as that described herein. Accordingly, the anti-microbial coating 200 may substantially prevent and/or inhibit harmful microorganism growth on the bag while the hydrophobic coating 210 may repel condensation to prevent frost or ice from forming on the outside of the bag 310. As a result, patrons may be less likely to acquire and transmit harmful microbes from using the ice merchandiser 100.

In other embodiments, the anti-microbial coating 200 may be structured as an additive used in the manufacture of the bag 310. However, the functionality of the bag 310 with the additive remains substantially similar to that of the bag 310 with the coating 200. In turn, the bagged ice protects the ice 320 (and patrons who handle the bag 310) from bacteria, algae, fungi, and mold. This biocide or anti-microbial additive provides a hygienic and health benefit by controlling/decreasing the amount of microorganism at the polymer surface of the bag. Moreover, the bagged ice 300 may remain free of odor and stain causing growth. This may be appealing to patrons and lead to an increase in sales potential.

Figure 22:
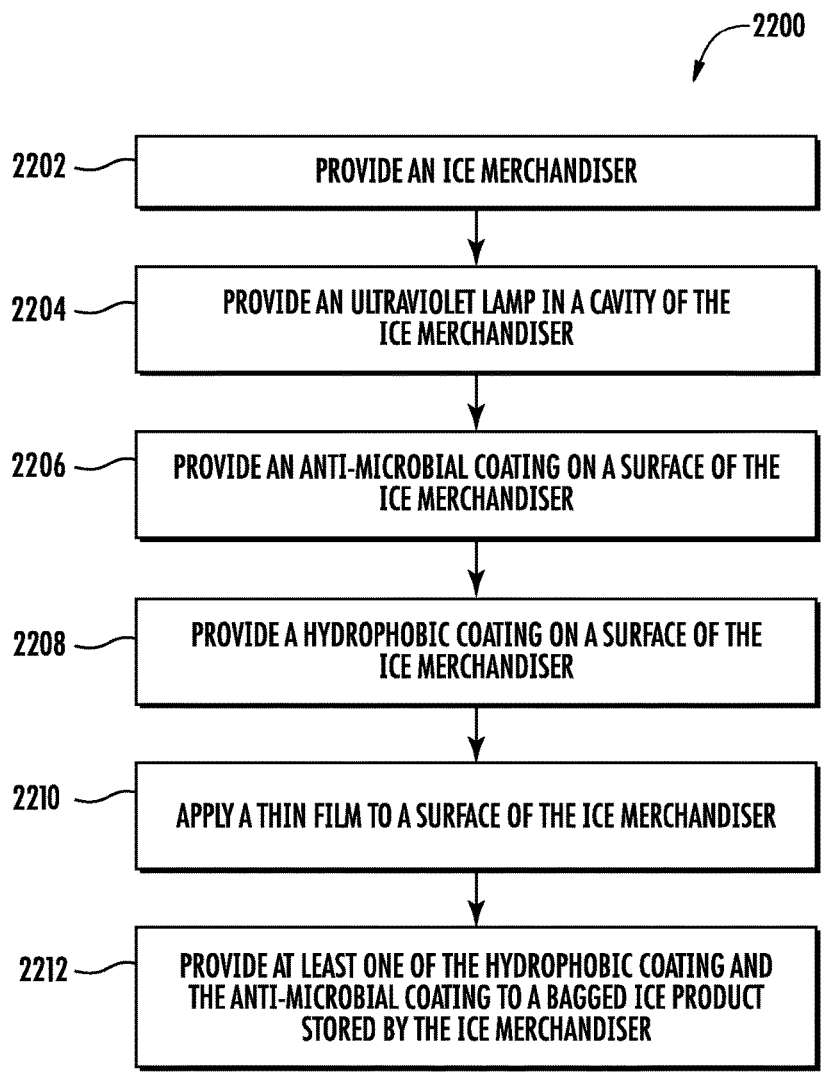
FIG. 22 is a flowchart of a method of providing a hygienic ice merchandiser, according to one embodiment.

Referring now to FIG. 22, a flowchart of a method 2200 of providing a hygienic ice merchandiser is shown according to one embodiment. According to one embodiment, method 2200 may be implemented with the ice merchandiser of FIGS. 15-20 and the bagged ice product of FIG. 21. Accordingly, reference may be made to those Figures in explaining method 2200.

At step 2202, an ice merchandiser is provided. The ice merchandiser may include any type of ice merchandiser, including but not limited to, a vertically oriented (i.e., upright) ice merchandiser where the door(s) are substantially perpendicular to the ground, a horizontal ice merchandiser with access door(s) oriented substantially parallel to the ground or floor, one or multiple door units, and the like. At step 2204, a UV lamp is provided in a cavity of the ice merchandiser. According to one embodiment, the UV lamp is structured as an ultraviolet germicidal irradiation lamp configured to emit a germicidal ultraviolet beam. At step 2206, an anti-microbial coating is provided on a surface of the ice merchandiser. In one embodiment, the anti-microbial coating is provide on surfaces on the interior of cavity and on the exterior of the cavity (e.g., handles, exterior door surfaces, etc.). In other embodiments, the anti-microbial coating may only be applied to exterior ice merchandiser surfaces. Like the UV lamp, the anti-microbial coating is structured to inhibit growth and/or terminate harmful microorganisms that may cause sickness to patrons utilizing the ice merchandiser. At step 2208, a hydrophobic coating is provided on a surface of the ice merchandiser. According to one embodiment, the hydrophobic coating is applied to interior surfaces within the cavity. The hydrophobic coating is structured to repel water, such that condensation and water is directed into zones structured to receive the water. For example, a drain may be included in the bottom of the cavity and the hydrophobic coating is applied in such a manner to direct all the water towards that drain. Accordingly, the hydrophobic coating may be selectively applied to control direction of the repelled water. At step 2210, a thin film is applied to a surface of the ice merchandiser. In one embodiment, the thin film is applied to a surface of a window on the ice merchandiser. The thin film is structured to prevent the formation of frost and condensation on the window to permit easy view into the cavity. As mentioned above, the thin film may be structured as an optically (substantially) clear polymer film.

At this point, method 2200 provides for a relatively hygienic (e.g., steps 2204-2206: the UV lamp and the anti-microbial coating) and "clear" (step 2210: application of the thin film to substantially prevent any haze or fog from occurring on the window to maintain easy view of the cavity) ice merchandiser. As a result, method 2200 may attract patrons to the ice merchandiser because they are less fearful of receiving and transmitting harmful microorganisms and can see that the ice merchandiser is stocked with bagged ice for the taking.

As further appeal to patrons, step 2212 provides for at least one of the hydrophobic coating and the anti-microbial coating being provided to the bagged ice product stored in the ice merchandiser. While the ice merchandiser may stay "clean and clear" from steps 2202-2210, suppliers may bring harmful microorganisms into the ice merchandiser when they stock and restock the ice merchandiser. Accordingly, step 2212 provides for reducing the harmful microorganisms on the bagged ice product itself. As a result, even during stocking and restocking, harmful microorganisms are substantially prevented from formation. In turn, method 2200 may provide a relatively cleaner and clearer ice merchandiser, which leads to an increase in sales potential and customer satisfaction.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

It is to be understood that the disclosure disclosed herein is not limited to the details of construction and the arrangement of the components set forth in the description or illustrated in the drawings. The disclosure is capable of other embodiments or being practiced or carried out in various ways. It is also to be understood that the phraseology and terminology employed herein is for the purpose of description and should not be regarded as limiting.

It is also important to note that although only a few embodiments of the combination food and beverage serving have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the disclosed embodiments. Accordingly, all such modifications are intended to be included within the scope of the present disclosure as defined in the disclosed embodiments.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be non-transitory, tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed:

1. An ice merchandiser for storing bagged ice product for purchase by a customer, the ice merchandiser comprising:
   a housing that defines a cavity for storing the bagged ice product;
   a payment system for facilitating a bagged ice product transaction at the ice merchandiser, the payment system including:
   a mass determination module structured to:
   determine a mass of bagged ice product removed during the bagged ice product transaction; and
   determine a bag quantity of a type of bagged ice product removed from the ice merchandiser based on the determined mass: and
   a transaction module structured to unlock a door of the ice merchandiser to enable removal of bagged ice product based on a validation of payment information of the customer, and determine an amount of currency required for the bagged ice product transaction based on the determined bag quantity of the type of bagged ice product removed.

2. The ice merchandiser of claim 1, wherein the payment system further includes an input module structured to receive an input, the input including at least one of a type of bagged ice product to be purchased, an amount of the type of bagged ice product to be purchased, an initiation for the bagged ice product transaction, a confirmation that the bagged ice product transaction is complete, and one or more pieces of identifying information to validate the bagged ice product transaction.

3. The ice merchandiser of claim 1, wherein the ice merchandiser further includes one or more load cells communicably coupled to the mass determination module, wherein the one or more load cells are structured to measure the mass of bagged ice product removed during the bagged ice product transaction.

4. The ice merchandiser of claim 3, wherein the one or more load cells are located at least one of within and outside of the cavity.

5. The ice merchandiser of claim 1, wherein the mass determination module includes a filter processor structured to remove inaccurate weight data from use in the determination of the mass of bagged ice product removed.

6. The ice merchandiser of claim 5, wherein the filter processor includes a timer structured to determine a constant mass of bagged ice product remaining in the ice merchandiser for a preset period of time.

7. An ice merchandiser for storing bagged ice for purchase by a customer, the ice merchandiser comprising:
   a housing defining a cavity;
   a door coupled to the housing;
   a platform located in the cavity for holding a bagged ice product;
   a load cell structured to measure a mass of the bagged ice product; and
   a payment system communicably coupled to the load cell, wherein the payment system is structured to unlock the door based on a validation of payment information of the customer, determine a mass of bagged ice product removed during a bagged ice product transaction, determine a bag quantity of a type of bagged ice product removed from the ice merchandiser based on the determined mass, and determine an amount of currency required for the bagged ice product transaction based on the determined bag quantity of the type of bagged ice product removed.

8. The ice merchandiser of claim 7, wherein the load cell is located at least one of within and outside of the cavity.

9. The ice merchandiser of claim 7, wherein the load cell is included with the platform.

10. The ice merchandiser of claim 7, wherein the payment system is structured to receive only a payment card, the payment card including at least one of a credit card, a debit card, and a rewards card.

11. The ice merchandiser of claim 7, wherein payment system is structured to determine an initiation and a completion of the bagged ice product transaction.

12. The ice merchandiser of claim 11, wherein the initiation of the bagged ice product transaction is based on the payment system receiving a payment card.

13. The ice merchandiser of claim 11, wherein the completion of the bagged ice product transaction is based on at least one of an input indicating that the bagged ice product transaction is complete and a constant mass of bagged ice product remaining in the ice merchandiser detected for a preset amount of time.

14. A method of operating an ice merchandiser, comprising:
receiving an initiation of a bagged ice product transaction;
validating the bagged ice product transaction;
unlocking a door of the ice merchandiser to enable removal of bagged ice product during the bagged ice product transaction based on the validation;
receiving weight data, the weight data corresponding to a mass of bagged ice product stored by the ice merchandiser;
determining that the bagged ice product transaction is complete;
determining a mass of bagged ice product removed by a customer during the bagged ice product transaction based on the weight data;
determining a bag quantity of a type of bagged ice product removed from the ice merchandiser based on the determined mass of bagged ice product removed; and
charging the customer for the determined bag quantity and type of bagged ice product removed.

15. The method of claim 14, wherein the bagged ice product transaction is initiated by receiving at least one of an input to begin the bagged ice product transaction and a payment card.

16. The method of claim 15, wherein the payment card includes at least one of a credit card, a debit card, and a rewards card.

17. The method of claim 14, wherein determining that the bagged ice product transaction is complete is based on at least one of receiving an input indicating that the bagged ice product transaction is complete and the weight data indicating that a constant mass of bagged ice product is remaining in the ice merchandiser for a preset period of time after the bagged ice product transaction has been initiated.

18. A system for an ice merchandiser for storing bagged ice for purchase by a customer, the system comprising:
one or more processors coupled to one or more memory devices, the one or more memory devices having instructions stored therein that are executable by the one or more processors to cause the one or more processors to:
determine a mass of bagged ice product removed during a bagged ice product transaction;
determine a bag quantity of a type of bagged ice product removed from the ice merchandiser based on the determined mass;
unlock a door of the ice merchandiser to enable removal of bagged ice product based on a validation of payment information of the customer; and
determine an amount of currency required for the bagged ice product transaction based on the determined bag quantity of the type of bagged ice product removed.

* * * * *